US009525911B2

(12) United States Patent
Atkin

(10) Patent No.: US 9,525,911 B2
(45) Date of Patent: Dec. 20, 2016

(54) TECHNIQUES FOR VIEWING MOVIES

(71) Applicant: XCINEX Corporation, Rockville, MD (US)

(72) Inventor: Cihan F. Atkin, Gaithersburg, MD (US)

(73) Assignee: XCINEX CORPORATION, Rockville, MD (US)

( * ) Notice: Subject to any disclaimer, the term of this patent is extended or adjusted under 35 U.S.C. 154(b) by 104 days.

(21) Appl. No.: 14/671,342

(22) Filed: Mar. 27, 2015

(65) Prior Publication Data

US 2015/0281774 A1  Oct. 1, 2015

Related U.S. Application Data

(60) Provisional application No. 61/971,028, filed on Mar. 27, 2014.

(51) Int. Cl.
*H04N 21/442* (2011.01)
*H04N 21/4223* (2011.01)
(Continued)

(52) U.S. Cl.
CPC ........ *H04N 21/44218* (2013.01); *G06Q 30/06* (2013.01); *H04N 21/25435* (2013.01);
(Continued)

(58) Field of Classification Search
None
See application file for complete search history.

(56) References Cited

U.S. PATENT DOCUMENTS 4,759,060 A   7/1988  Hayashi et al.
4,769,697 A   9/1988  Gilley et al.
(Continued)

FOREIGN PATENT DOCUMENTS

WO   2008127235 A2   10/2008
WO   2011085384 A2   7/2011
WO   2013173272 A2   11/2013

OTHER PUBLICATIONS

The International Search Report and the Written Opinion, PCT/US13/40860, Dec. 4, 2013, 10 pages.
(Continued)

*Primary Examiner* — Nicholas Corbo
*Assistant Examiner* — Alexander Q Huerta
(74) *Attorney, Agent, or Firm* — Edell, Shapiro & Finnan, LLC

(57) ABSTRACT

Apparatus is disclosed for streaming pay-per-view digital content to a content display unit a viewing audience is watching in a viewing area. An audience detection controller controls the display of content as a function of whether or not payment has been received for the number of viewers present in the viewing audience. The controller includes one or more light responsive cameras combined with a thermal camera to detect a presence of one or more members of the audience in the viewing area, and an operating system to analyze the captured images to detect the number of persons of the audience. The controller further includes a reverse camera to capture a watermark inserted in the streaming content to confirm the controller is in the same room as the display unit, IR lighting, and ambient light sensors to detect ambient light conditions.

20 Claims, 16 Drawing Sheets

(51) Int. Cl.
*H04N 21/8358* (2011.01)
*H04N 21/643* (2011.01)
*H04N 21/2543* (2011.01)
*G06Q 30/06* (2012.01)

(52) U.S. Cl.
CPC ... *H04N 21/4223* (2013.01); *H04N 21/64322* (2013.01); *H04N 21/8358* (2013.01)

(56) References Cited

U.S. PATENT DOCUMENTS

| | | |
|---|---|---|
| 4,849,737 A | 7/1989 | Kirihata et al. |
| 4,907,079 A | 3/1990 | Turner et al. |
| 5,070,400 A | 12/1991 | Lieberman |
| 5,221,919 A | 6/1993 | Hermans |
| 5,771,307 A | 6/1998 | Lu et al. |
| 5,793,409 A | 8/1998 | Tetsumura |
| 5,892,900 A | 4/1999 | Ginter et al. |
| 5,977,964 A | 11/1999 | Williams et al. |
| 7,006,630 B2 * | 2/2006 | Yu .................. H04N 5/913 348/14.01 |
| 7,134,130 B1 | 11/2006 | Thomas |
| 7,460,859 B2 | 12/2008 | Light et al. |
| 7,466,844 B2 | 12/2008 | Ramaswamy et al. |
| 7,609,853 B2 | 10/2009 | Ramaswamy et al. |
| 7,721,305 B2 | 5/2010 | Anderson |
| 8,032,914 B2 | 10/2011 | Rodriguez |
| 8,065,703 B2 | 11/2011 | Wilson et al. |
| 8,125,512 B2 | 2/2012 | Fahn et al. |
| 8,194,923 B2 | 6/2012 | Ramaswamy et al. |
| 8,306,265 B2 | 11/2012 | Fry et al. |
| 8,355,951 B1 | 1/2013 | Daniel |
| 8,371,499 B2 | 2/2013 | Manuel-Devadoss |
| 8,516,533 B2 * | 8/2013 | Davis .................. H04N 21/482 725/115 |
| 8,539,357 B2 | 9/2013 | Hildreth |
| 8,544,033 B1 | 9/2013 | Acharya et al. |
| 8,613,008 B2 | 12/2013 | Daniel |
| 8,640,021 B2 * | 1/2014 | Perez .................. G06Q 30/02 715/203 |
| 8,661,461 B1 | 2/2014 | Maurer et al. |
| 2002/0169724 A1 * | 11/2002 | Moroney ............ G06Q 30/018 705/52 |
| 2004/0030599 A1 | 2/2004 | Sie et al. |
| 2005/0038749 A1 | 2/2005 | Fitch et al. |
| 2007/0288484 A1 | 12/2007 | Yan et al. |
| 2008/0046930 A1 | 2/2008 | Smith et al. |
| 2008/0159591 A1 | 7/2008 | Ruedin |
| 2009/0030643 A1 | 1/2009 | White et al. |
| 2009/0034793 A1 | 2/2009 | Dong et al. |
| 2009/0138805 A1 | 5/2009 | Hildreth |
| 2010/0070988 A1 | 3/2010 | Cohen et al. |
| 2010/0077421 A1 | 3/2010 | Cohen et al. |
| 2010/0162285 A1 | 6/2010 | Cohen et al. |
| 2010/0218206 A1 | 8/2010 | Biemans |
| 2011/0063440 A1 | 3/2011 | Neustaedter et al. |
| 2011/0147448 A1 * | 6/2011 | Manuel-Devadoss . G06Q 30/02 235/375 |
| 2011/0154385 A1 * | 6/2011 | Price et al. ............ H04H 60/45 725/12 |
| 2011/0194730 A1 | 8/2011 | Rhoads et al. |
| 2011/0215932 A1 | 9/2011 | Daniel |
| 2011/0321103 A1 | 12/2011 | Yao |
| 2012/0011555 A1 * | 1/2012 | Qian ................ H04N 21/26241 725/109 |
| 2012/0167123 A1 * | 6/2012 | Gavita ............... H04N 21/4223 725/10 |
| 2012/0278904 A1 * | 11/2012 | Perez .................. G06F 21/10 726/31 |
| 2012/0304206 A1 | 11/2012 | Roberts et al. |
| 2013/0232517 A1 * | 9/2013 | Reis dos Santos ............. H04N 21/44213 725/14 |
| 2014/0040926 A1 * | 2/2014 | Maurer ............... H04N 21/2543 725/8 |
| 2015/0365723 A1 * | 12/2015 | Gonzalez ......... H04N 21/44218 725/1 |
| 2016/0065902 A1 * | 3/2016 | Deng .................... H04H 60/31 348/77 |

OTHER PUBLICATIONS

PCT International Search Report and the Written Opinion, PCT/US2015/023047, Jul. 9, 2015, 9 pages.

* cited by examiner

TECHNIQUES FOR VIEWING MOVIES

CROSS REFERENCE TO RELATED APPLICATIONS

The present application is a non-provisional application based on and claiming priority from U.S. Provisional Application No. 61/971,028, entitled "Techniques for Viewing Movies", filed Mar. 27, 2014, the disclosure which is hereby incorporated herein by reference in its entirety.

FIELD OF THE INVENTION

The present invention pertains generally to a system, method and apparatus for providing consumers the opportunity to watch multimedia content in the comfort of their own homes or at a location with a display device and high-speed internet connection, particularly first-run multimedia content such as movies, live concerts and sporting events, musicals, operas, Broadway shows, comedy shows, and seminars.

BACKGROUND OF THE INVENTION

There are numerous techniques available for delivering multimedia content to members of an audience in an in-home environment or in another environment. For instance, a system and apparatus have been developed wherein a content delivery device is provided which detects an activation event. The activation event causes the content delivery device to operate in a first mode to detect a presence of one or more members of an audience in a viewing area. Once the number of members of the audience in the viewing area is determined, the content delivery device switches to a second mode to initiate a payment for the multimedia content based on the number of members of the audience. Upon determining that an appropriate payment has been received, the content delivery device switches to a third mode to deliver the multimedia content to the members of the audience in the viewing area. The content delivery device periodically operates the content delivery device in the first mode concurrently with the third mode while the content is being delivered to members of the audience. When the content delivery device is operating concurrently in the first and third modes, a determination is made as to whether a change in the number of members of the audience in the viewing area has occurred and, if so, the content delivery device can determine whether additional payment is required (e.g., if a new number of audience members is in the viewing area). If an additional payment is required, the content delivery device will pause the delivery of the multimedia content temporarily and switch to the second mode until the additional payment is received. Upon appropriate payment or adjustment of the number of audience members, the content delivery device will switch back to the third mode upon confirmation that the additional payment has been received. See, for example, my U.S. Pat. No. 8,893,163, the disclosure which is hereby incorporated herein by reference in its entirety.

While my system may operate as an on-demand virtual cinema—adding new movies every week just like the regular movie theaters—the entertainment industry, e.g., the content makers, theater companies, and exhibitors, remain reluctant to make first run content available directly to a customer without additional safeguards to assure that the first-run content is not illegally shared or recorded.

SUMMARY OF THE INVENTION

Accordingly, it is an object of the present invention to provide an improved system, method and apparatus for providing consumers the opportunity to watch first-run motion pictures available only at cinemas or theaters, live concerts and sporting events, musicals, operas, Broadway shows, comedy shows, and seminars in the comfort of their own homes, at any location with a display device and high-speed internet connection, or on-the-go with a mobile device, such as a smartphone or a tablet, while providing additional safeguards to preclude first-run content from being shared or recorded without authorization.

It is another object of the present invention to provide a pay-per-view-per-person-per-unit of time system for enabling users to watch first-run content, such as first-run motion pictures available only at cinemas or theaters, live concerts and sporting events, musicals, plays, operas, Broadway shows, comedy shows, seminars, as well as other content, such as a-la-carte premium TV programming, at non-theater locations (e.g., at home).

It is a further object of the present invention to provide an improved system, method and apparatus with enhanced authentication and verification schemes which ensure that content is delivered to the appropriate number of viewers and that a user provides adequate payment for the proper number of viewers.

Still another object of the present invention is to provide an improved system, method and apparatus which includes upgraded security features to confirm that a controller is in the same room as the display unit (e.g., Smart TV) to which the content is being streamed.

One aspect of the invention provides a controller with one or more light responsive cameras combined with a thermal camera to detect a presence of one or more members of an audience in a viewing area.

Another aspect of the invention provides a controller wherein the controller, after sensing an additional member of the audience in the viewing area, operates in a standby mode to initiate a delay before pausing the delivery of the multimedia content temporarily and switching to an additional payment request mode.

A still further aspect of the invention provides a controller device wherein IR light sources emit IR light into the viewing area occupied by members of the audience to detect if any external recording devices, such as one or more cameras, are pointed at the display device which suggest an attempt is being made to pirate a streaming movie.

In a preferred embodiment, the controller includes a reverse camera which looks-back at the screen of the display unit and reads special code in pixel data from the screen to confirm the controller is in the same room as the display unit to which the content is being streamed.

In another embodiment, the controller utilizes an audio logger system to ensure the controller is always in the same viewing area as the display unit, e.g., a Smart TV, tablet, smartphone, or other in-home entertainment device.

In a further embodiment, a server side watermarking system inserts a digital system watermark, such as a company logo, into streamed content to ensure the controller is always in the same viewing area as the display unit, e.g., a Smart TV, tablet, or smartphone, or other in-home entertainment device.

In yet a further embodiment, a server side watermarking system inserts a digital personal watermark, such as a member's user ID and Internet Password (IP), into the streamed content to not only confirm the controller is always in the same viewing area as the display unit, e.g., a Smart TV, tablet, or smartphone, or other in-home entertainment device but, in the event content is illegally copied or stolen, to provide identifying information which can be traced back to the user who pirated the content.

Other aspects and advantages of the disclosure will be apparent to those skilled in the art upon reviewing the drawings referenced below and reading the following detailed description.

BRIEF DESCRIPTION OF THE DRAWINGS

The above mentioned and other features of the present invention, and the manner of attaining them, will become more apparent and the invention itself will be better understood by reference to the following description of embodiments of the invention taken in conjunction with the accompanying drawings, wherein like reference numerals in the various figures are utilized to designate like components and elements, and in which.

DETAILED DESCRIPTION OF THE INVENTION

The techniques described herein relate to an improved system, method and apparatus for delivering first-run multimedia content to members of an audience with enhanced authentication and verification schemes to ensure that content is delivered to only the appropriate number of viewers, that a user provides adequate payment for the appropriate number of viewers, and that a controller device providing the enhanced authentication and verification schemes is always in the same location, viewing area, or room as the display device to which streamed content is being display.

Figure 1:
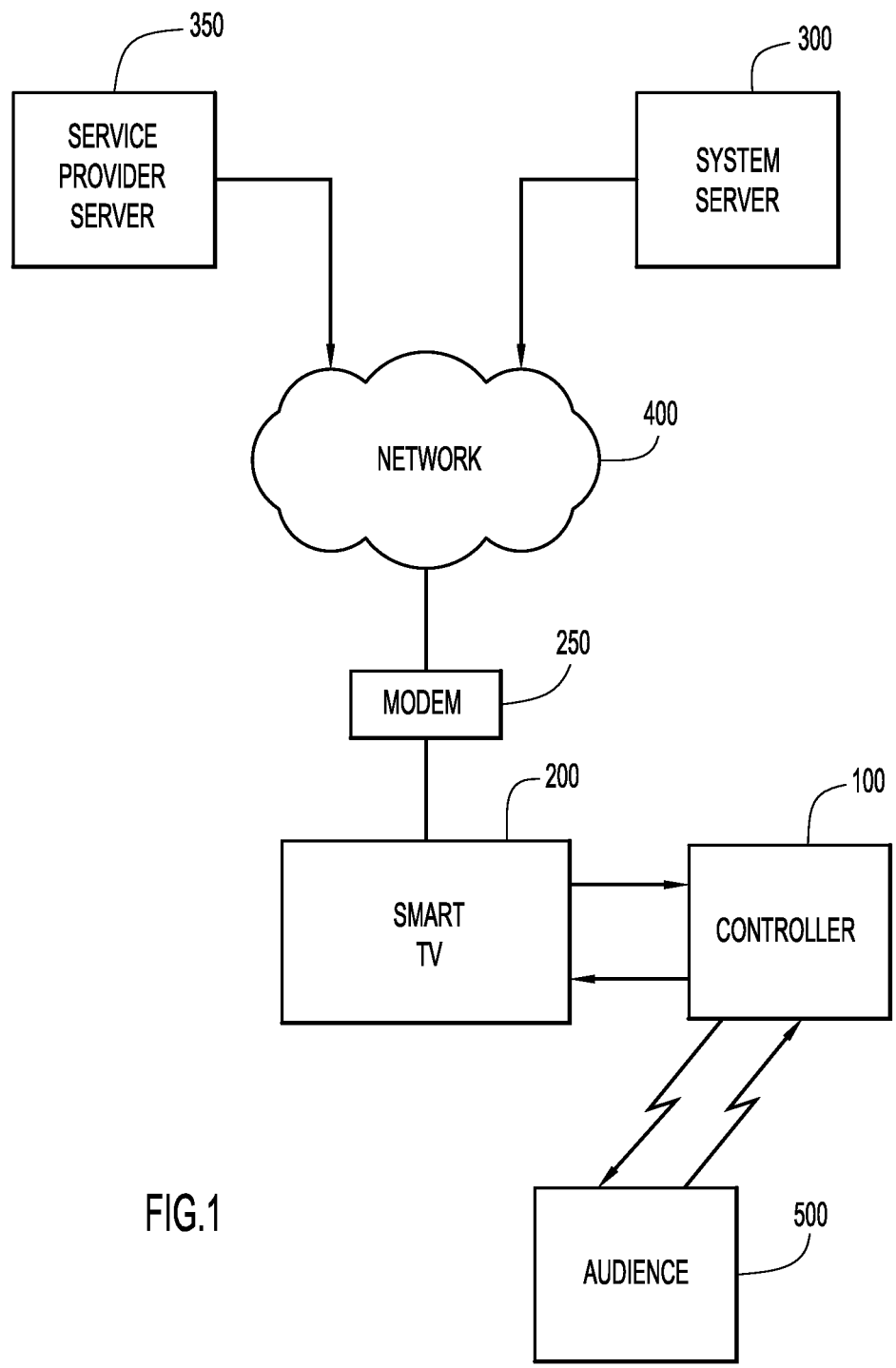
FIG. 1 shows an example block diagram depicting components of the system to deliver first-run and other content to consumers.

FIG. 1 diagrammatically illustrates an example of a system configured according to the present invention. A content presentation/display unit, such as a smart TV 200, at the home or other location of the end user or consumer, is controlled by an audience detection controller 100 at that location. The content presentation/display unit 200 may be a simple TV with a set top box or other unit connected thereto to provide the "smart" functions required of a smart TV. The smart TV 200 is configured to receive content via a local modem 250 from a service provider 350 via a network 400 such as a cable, dish, or internet subscription service, a broadcast station, etc. The system server 300 of the present invention delivers its content, when selected by the end user, to the modem 250 and smart TV via network 400. The audience detection controller 100 controls the display of content received from system server 300 as a function of whether or not payment has been received for at least the number viewers present in the viewing audience 500 for the smart TV 200 in the manner described herein.

Figure 2:
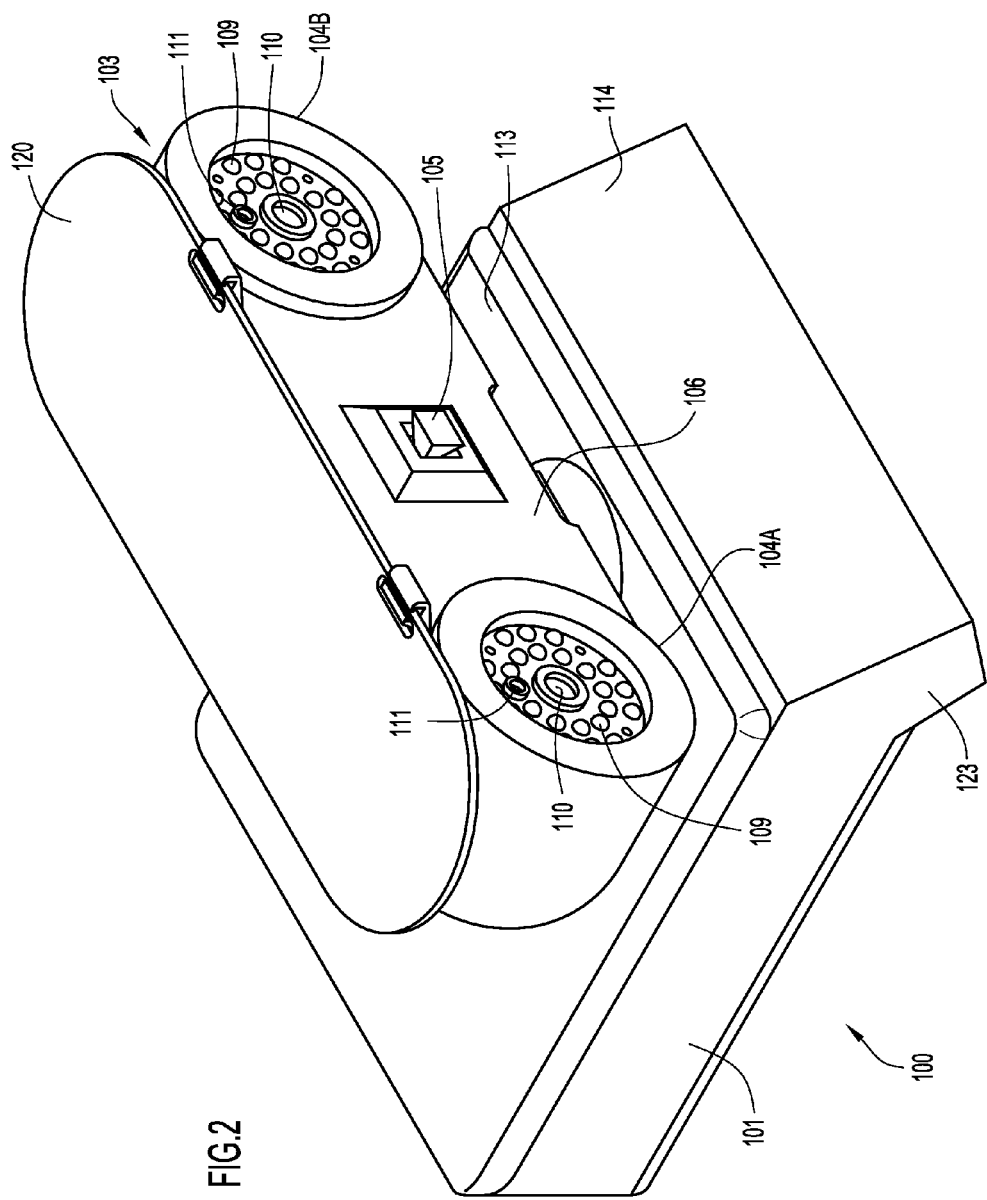
FIG. 2 is a perspective view from above, right, of a controller according to one aspect of the present invention.
Figure 3:
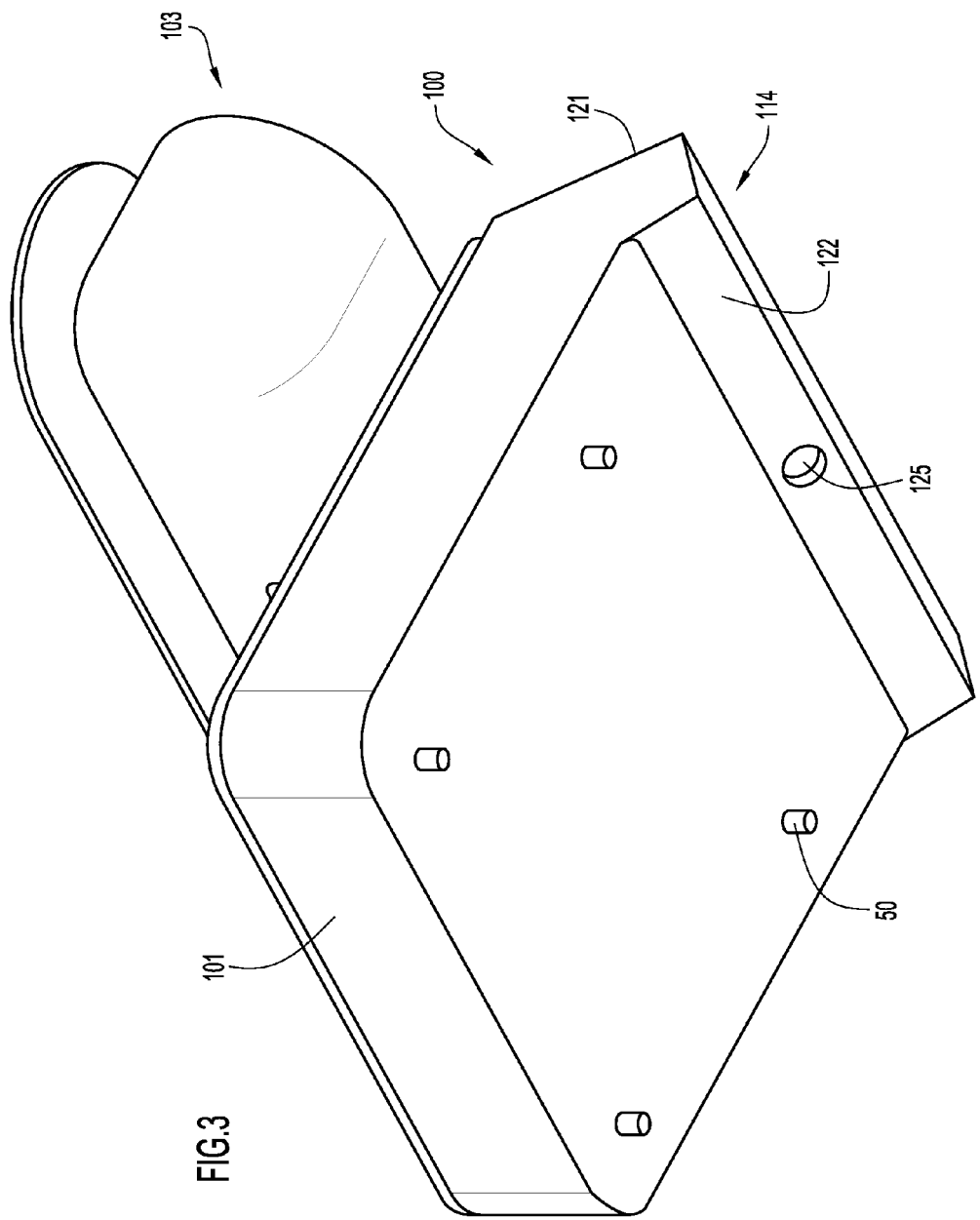
FIG. 3 is a perspective view from below, right, of the controller of FIG. 1 showing the reverse camera aperture and the attachment means for attaching the controller to a display unit.
Figure 12:
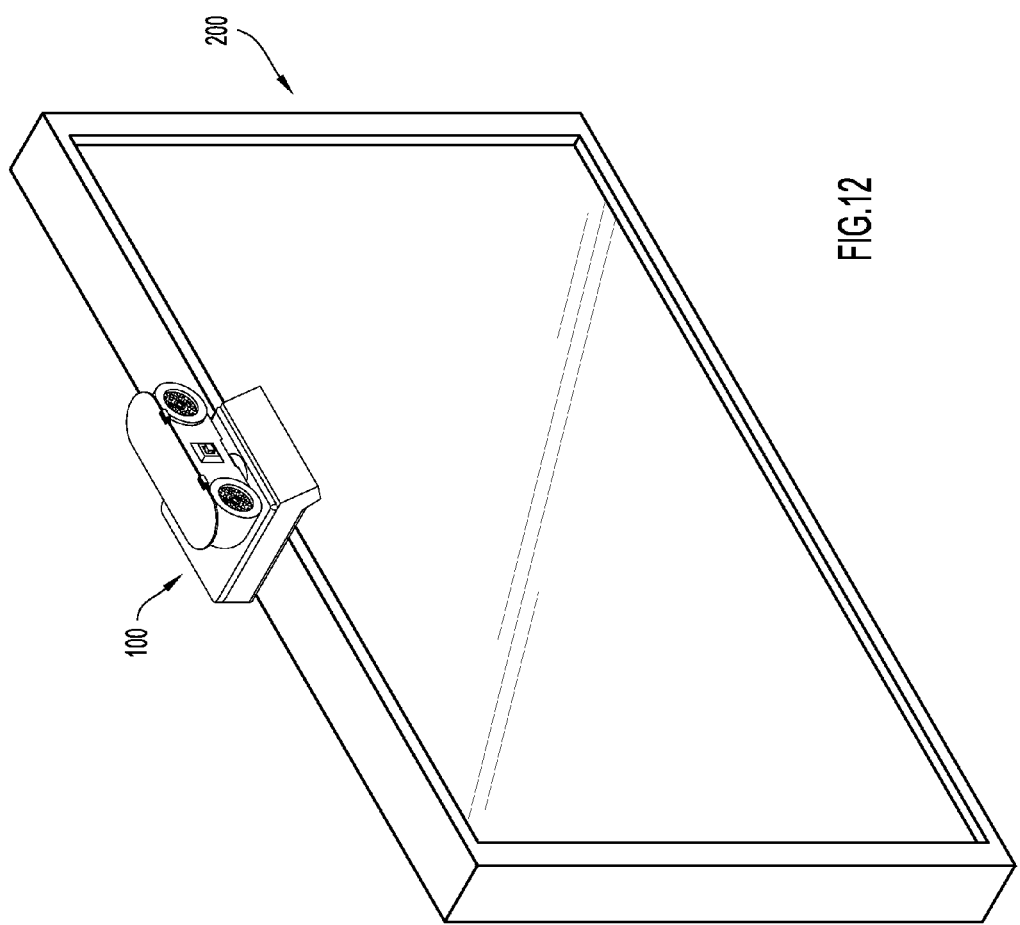
FIG. 12 is a perspective view from the right and above, of the controller of FIG. 1 attached to an upper edge of a display unit.
Figure 13:
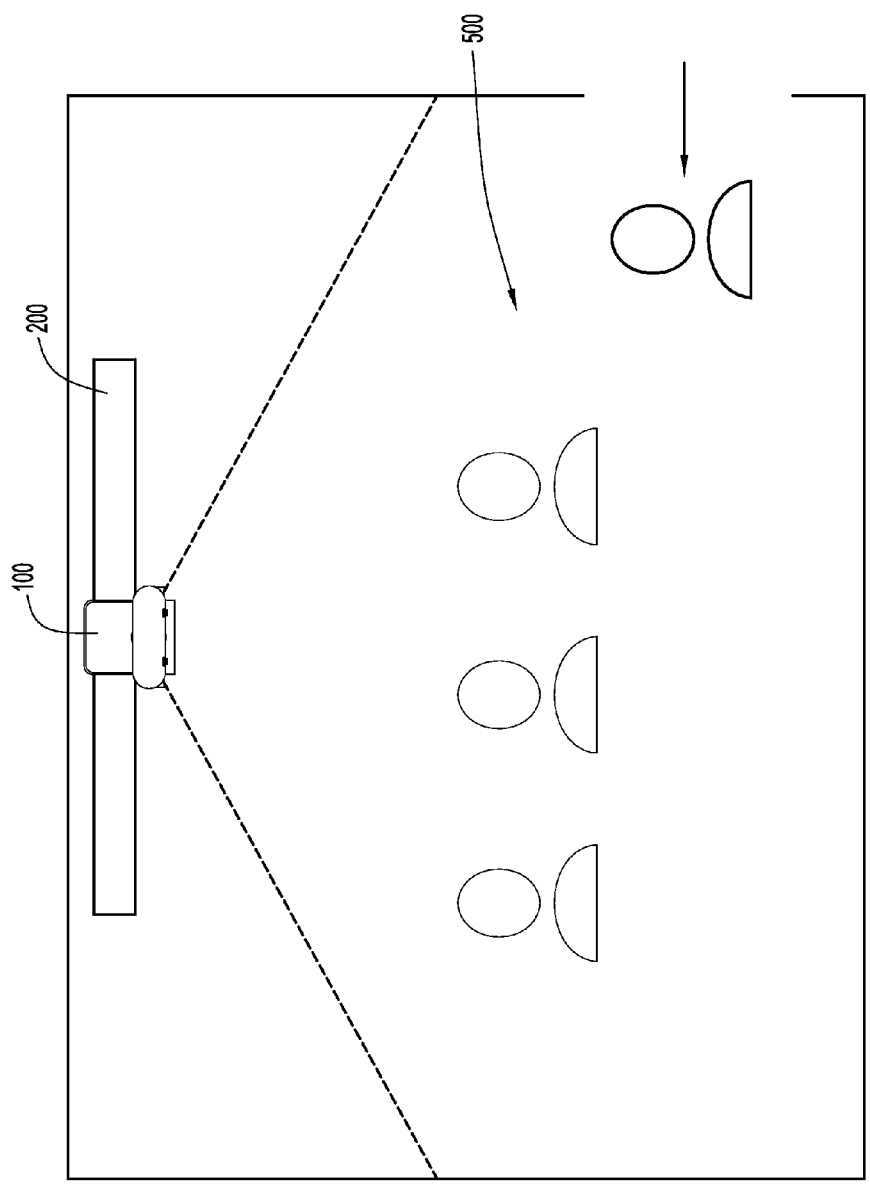
FIG. 13 diagrammatically shows an example environment depicting a controller attached to a display unit, and a plurality of audience members—one just entering the environment.

With reference to FIGS. 2, 3 and 12, a detection controller 100 is shown which is configured to be secured to or at an upper edge of a display unit 200 (see FIG. 12). The display unit 200 may be a Smart TV, a tablet, a smartphone, or other interactive in-home entertainment device, such as a PlayStation™, Xbox™, Nintendo Wii™, or any other electronic equipment that has access to high speed internet or functionally similar network medium and in which propriety system software may be installed into its operating system by the controller 100 to accomplish the techniques described herein. In addition, the TV, in and of itself, does not have to be a Smart TV but can be considered "smart" by being connected to commonly provided set top box (STB) equipment, such TIVO, smart cable boxes, etc. Once the controller 100 downloads and installs the propriety system software onto the operating system of display unit 200, the controller communicates via Wi-Fi or direct connection with LAN to access the internet. Upon connection to the internet, the controller 100 communicates with system server 300 and display unit 200 to obtain user network access information. The controller communicates with the display unit via Bluetooth, Wi-Fi, or other suitable short-range radio technology to obtain user network access information.

The controller 100, as shown in FIGS. 2-5 and 11, is a fully enclosed, self-standing, electronic device which houses infra-red (IR) light sources 109, and a plurality of video and still image capturing systems 104A, 104B, 105 configured to capture an approximately 150°-360° video, multiple still images, or both, of the location, viewing area, or room in which the controller 100 is synced to the display unit 200. The controller further houses a reverse camera 112 configured to capture a screen shot of the display unit 200, servo motors 116, 117 for rotating a camera module housing the IR light sources and the plurality of video and still image capturing systems, electronic control components 108, and a microphone 107. The controller 100 utilizes the image and video capturing systems 104A, 104B, 105 (individually or together) such as a thermal camera, HD cameras, 3D cameras, IR light sources, and other suitable equipment, to scan the location, viewing area or room, typically in a 150° horizontal viewing angle but possibly up to 360°, to capture multiple images and/or video of the location, viewing area, or room to detect the number of persons in the location, viewing area or room.

As will now be described with reference to FIGS. 2, 4, and 11, the controller 100 includes a base 101 and a camera module 103. Attachment means 50 extend downwardly from the bottom surface of the controller and are configured to securely attach the controller to the upper edge of the display unit 200 (see FIG. 9). The attachment means are shown in FIG. 3 as being circular pegs spaced a fixed distance apart. However, any other suitable attachment means may be used, including adjustable attachment mechanisms which may be reconfigured to accommodate display units of varying depths and thickness. The module 103 houses a first HD camera 104A and a second HD camera 104B spaced a sufficient distance apart to provide stereoscopic vision, i.e., stereoscopic imaging defining a system field of view, and a thermal camera 105 positioned between the HD cameras. The HD cameras 104A, 104B and the thermal camera 105 extend forwardly from a front face 106 of the camera module 103, as illustrated in FIG. 2. The HD cameras 104A, 104B are used to capture clear video or still images of the location, viewing area, or room in which the display unit displaying the streaming content is located. The thermal camera 105 is used to detect body heat of persons of the audience in the same room, area or location as the display unit 200. The HD cameras and the thermal camera preferably have an approximately 50° to 60° viewing angle. Under the control of software installed in the operating system of the controller 100, the controller analyzes the captured still images and/or video to detect the number of persons of the audience. Once the analysis is completed, the controller immediately deletes the images and/or video to ensure the security and/or privacy of the consumer.

Figure 4:
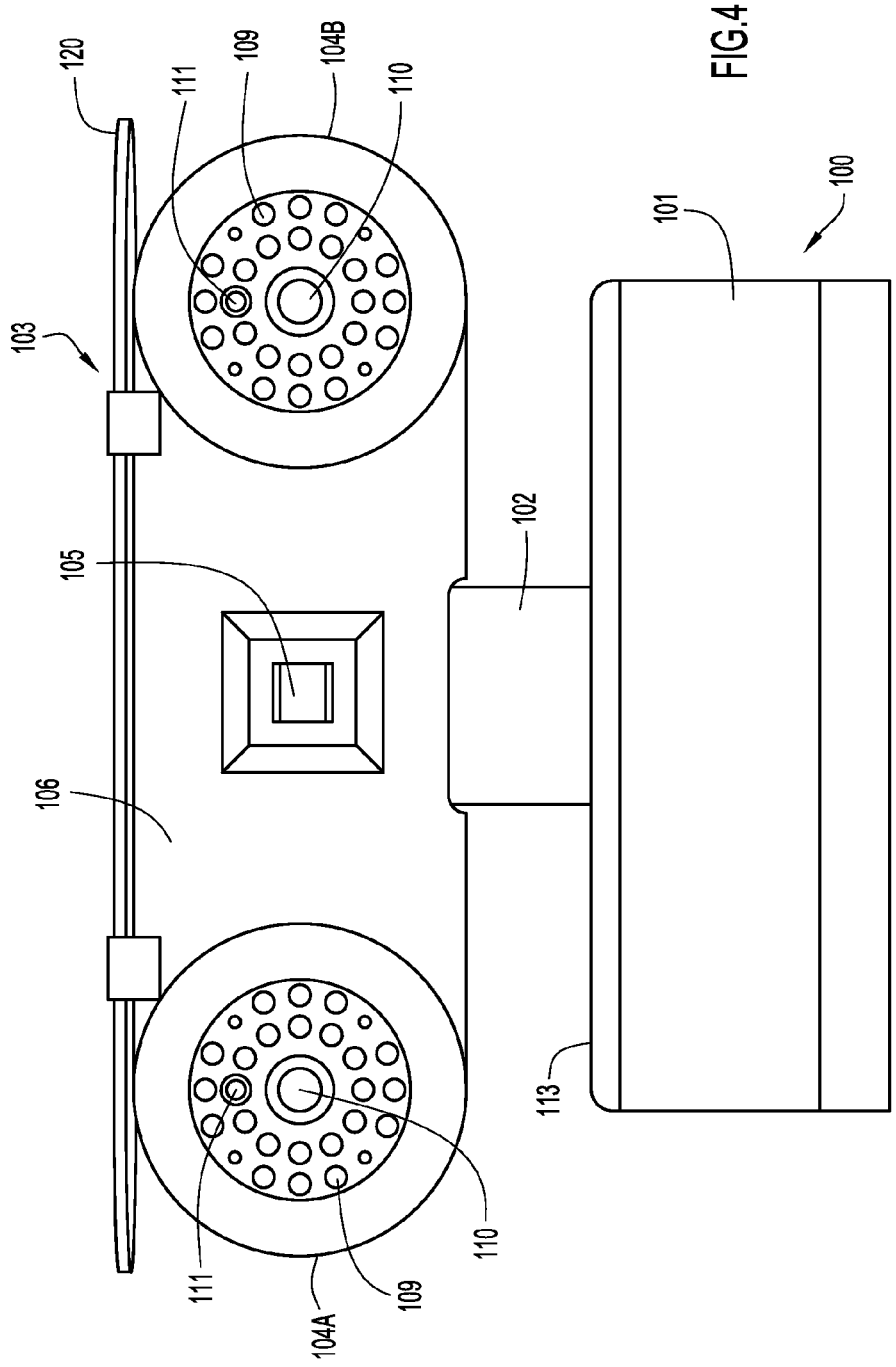
FIG. 4 is a front view in elevation of the controller of FIG. 1 showing the HD and thermal cameras.
Figure 8:
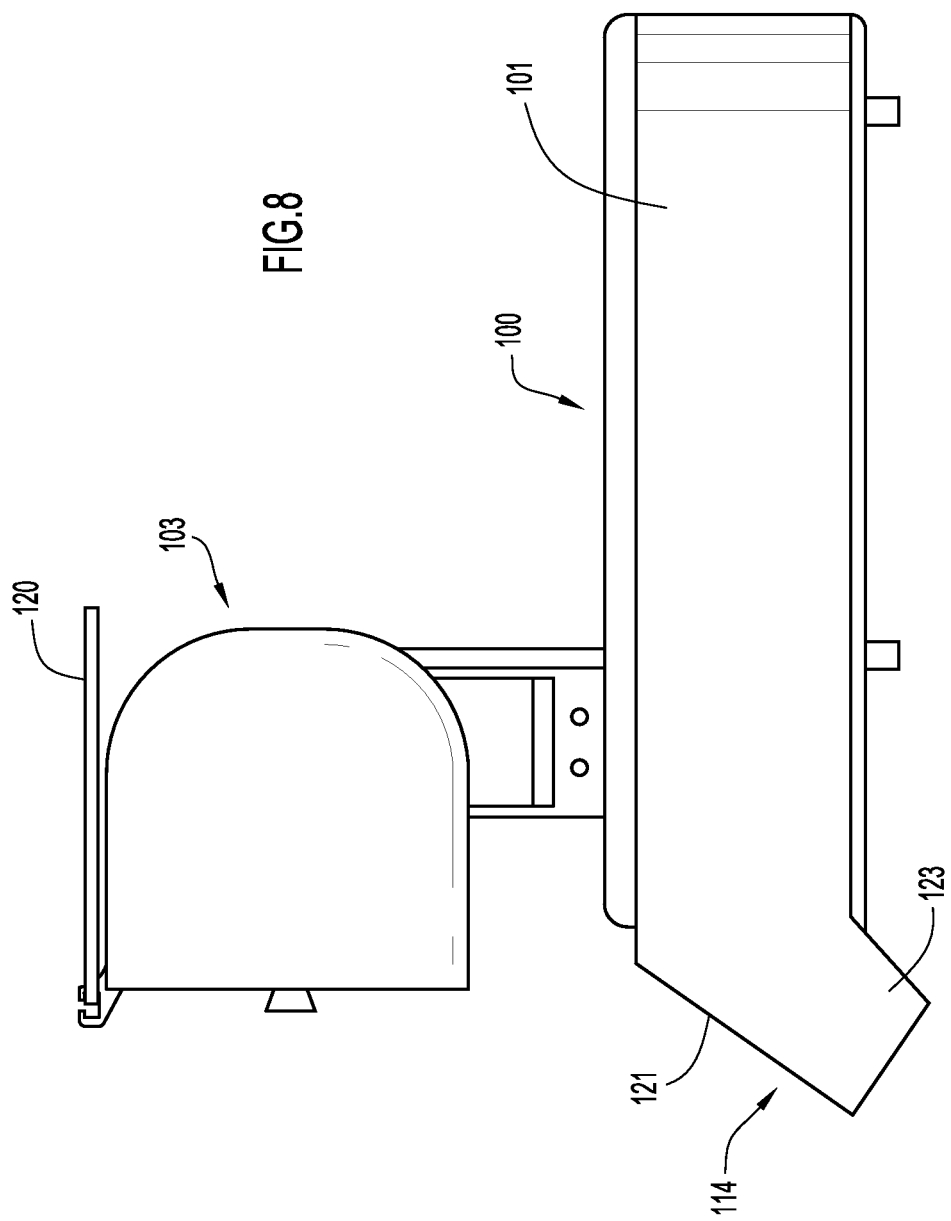
FIG. 8 is a right side view in elevation of the controller of FIG. 1 showing the front cover flap of the camera module in an open position.
Figure 9:
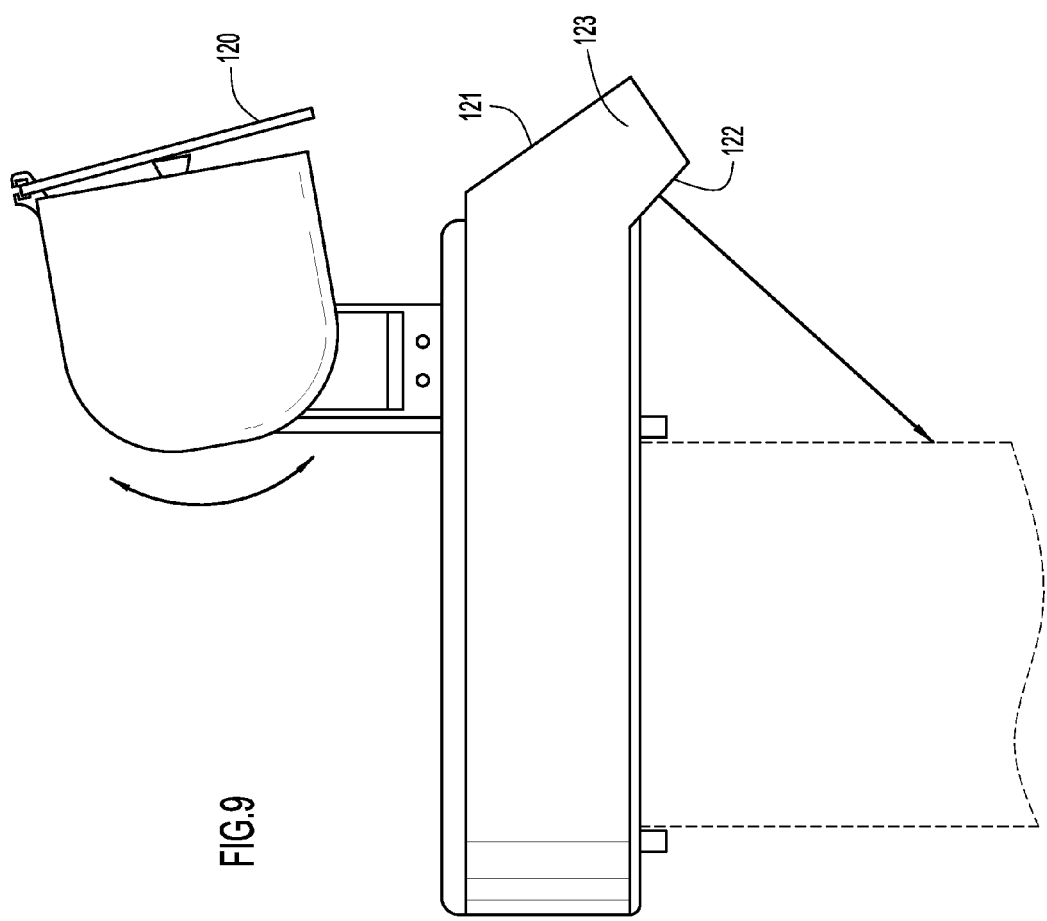
FIG. 9 is a left side view in elevation of the controller of FIG. 1 showing the camera module rotated upward about a horizontal axis and the portion of the display unit screen the reverse camera is focused.
Figure 10:
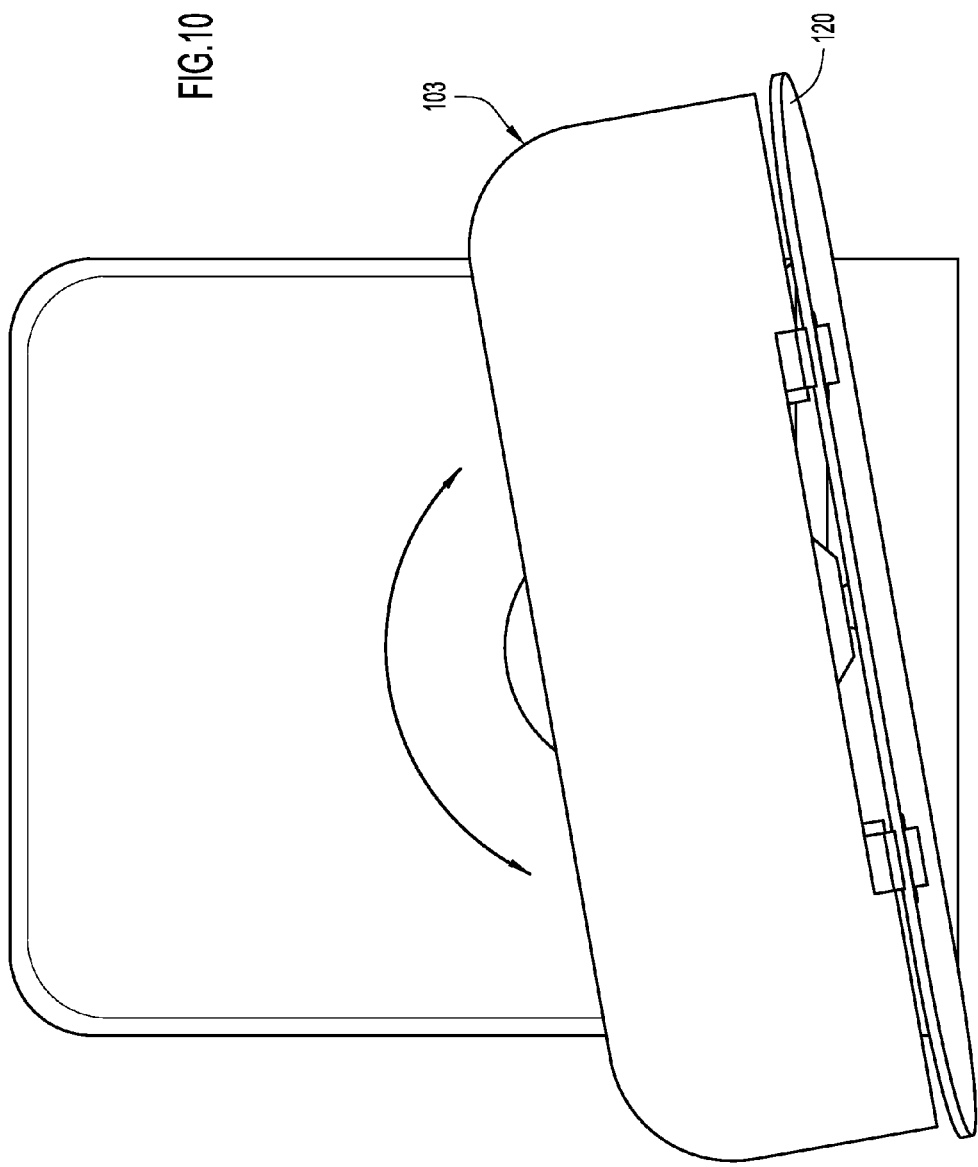
FIG. 10 is a top section view of the controller of FIG. 1 showing the camera module rotated to the right about a vertical axis and the front cover flap of the camera module in a closed position.

Additionally, a vertically extending hollow support post 102 is secured at one of its ends to an upper wall surface 113 of the base 101 (FIG. 4). The support post extends upwardly from the upper wall surface and has walls defining an interior space 115 (see FIG. 11). The camera module 103 is secured to the other end of the support post 102 and supported by the post above the upper wall surface of the base 101 (FIG. 8). The module 103 and the other end of support post 102 are configured in such a manner (e.g., joined by a universal joint) as to permit the module to be pivoted with respect to the other end of the support post about a vertical and horizontal axis (see FIGS. 9 and 10). The controller 100 includes a first servo motor 116 for automatically rotating the camera module about the horizontal axis (FIG. 9), and a second of servo motor 117 for automatically rotating the camera module about the vertical axis (FIG. 10). As shown in FIG. 11, servo motor 116 for panning the camera module up and down is housed within the post 102, while servo motor 117 for panning the camera module left and right is housed within the base 101. Pivotally mounting module 103 for rotation about vertical and horizontal axes enables the HD cameras 104A, 104B and the thermal camera 105 to capture video and/or still images of the location, viewing area, or room from wall to wall and ceiling to floor. Suitable commercially available servo motors usable in the controller device 100 of the present invention are the Lynx "Pan/Tilt" micro servo motors—manufactured by Lynxmotion.

Figure 5:
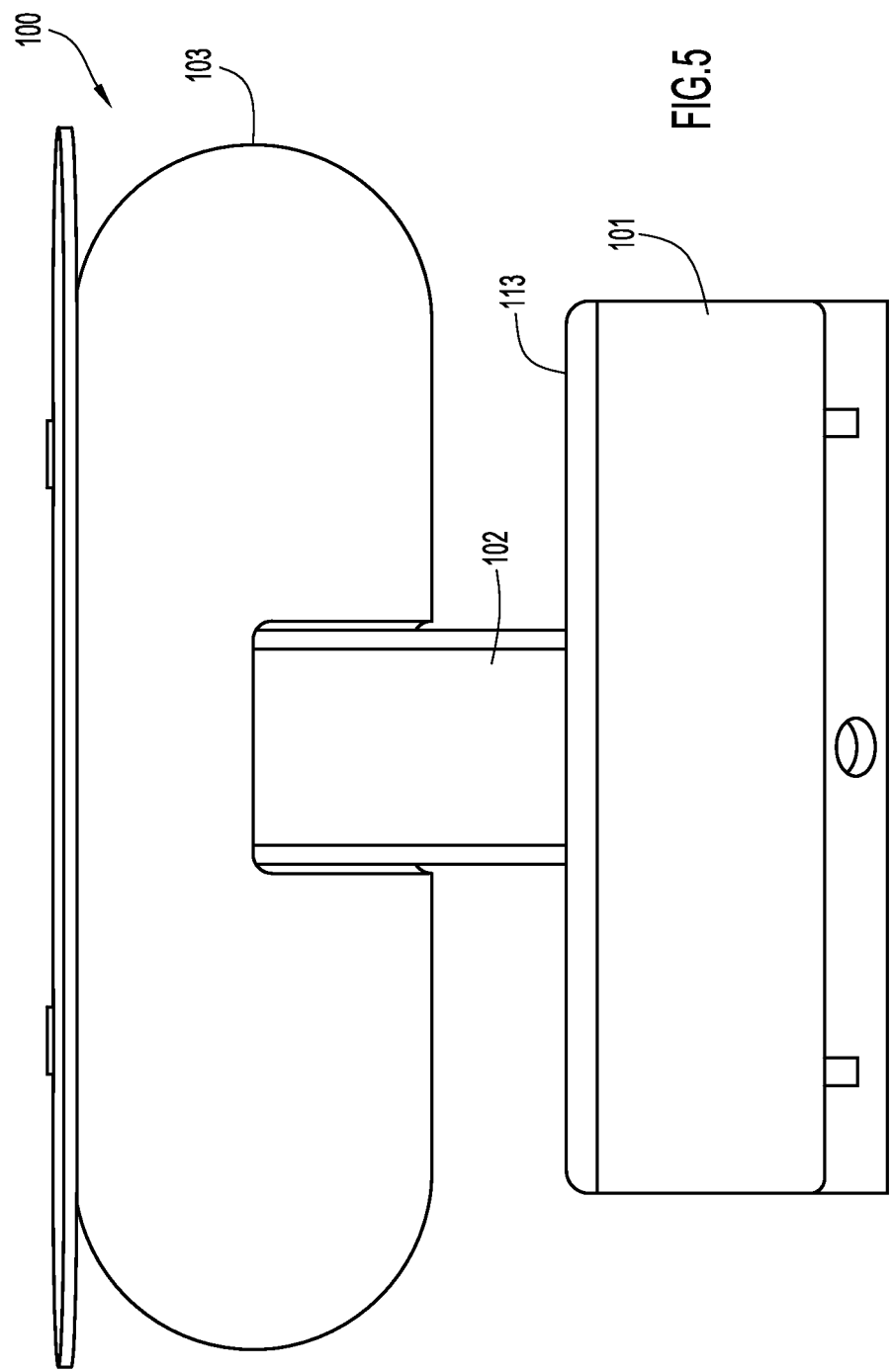
FIG. 5 is a rear view in elevation of the controller of FIG. 1 showing the reverse camera aperture.
Figure 6:
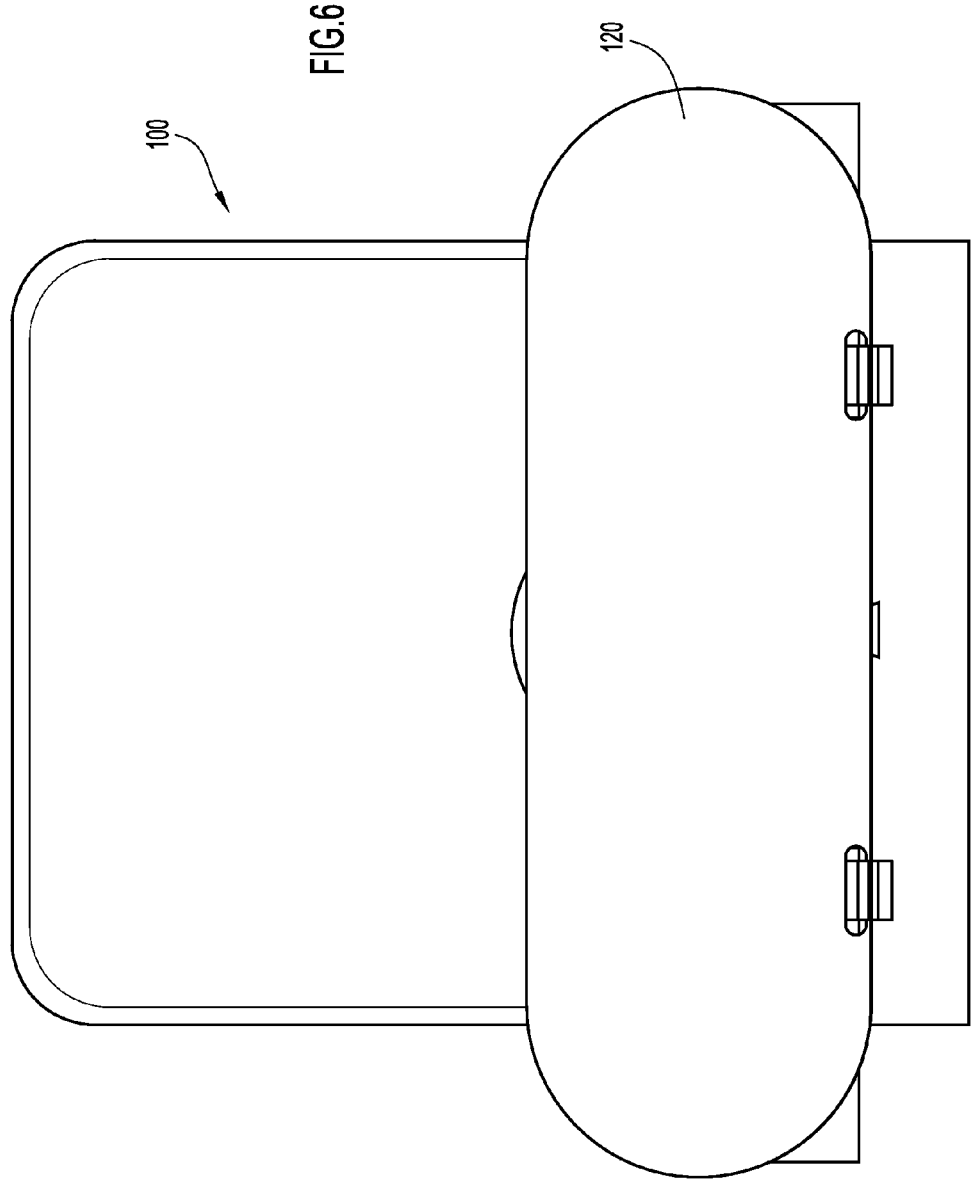
FIG. 6 is a top view in plan of the controller of FIG. 1 showing a front cover flap of the camera module in an open position.
Figure 7:
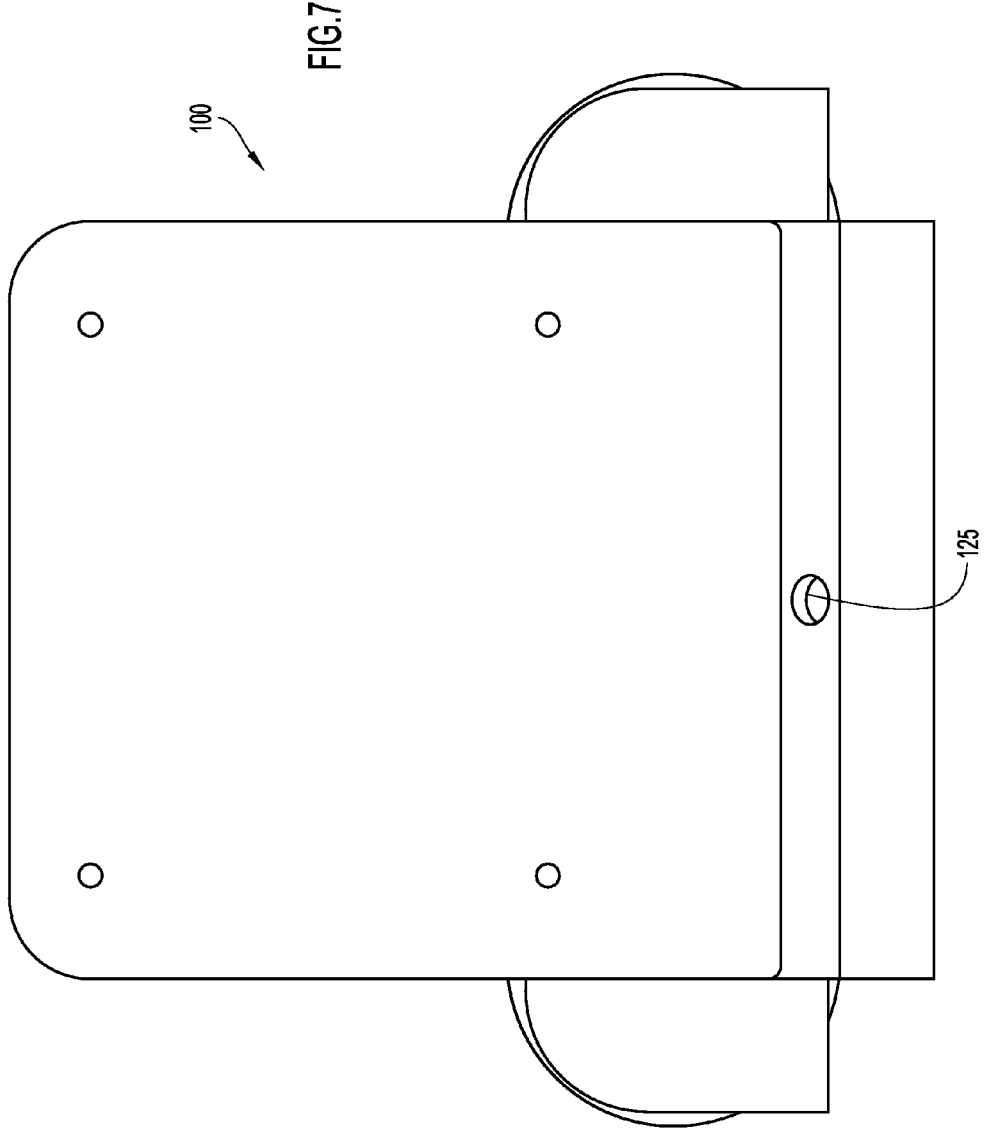
FIG. 7 is a bottom view in plan of the controller of FIG. 1 showing the reverse camera aperture.

A microphone 107 and electronic control components 108 are mounted within base 101 of the controller 100 (see FIG. 11) and a front cover flap 120 is pivotally attached to a front edge of the module 103 (see FIGS. 2 and 5). The flap 120 is rotatable between an open position (FIG. 8) and a closed position (FIG. 9). In the closed position, the flap covers the HD cameras 104A, 104B and thermal camera 105 to further ensure the security and/or privacy of the consumer. The microphone 107 (as well as the other systems described herein) is used to ensure that the controller device 100 is always in the same location, viewing area, or room as the display unit 200 which multimedia content is being streamed to/from a system server 300, as will be described in greater detail below.

A cluster of IR lights 109 surrounds each lens 110 of the HD cameras 104A, 104B to illuminate the location, viewing area, or room in which the controller 100 is located when the ambient lighting conditions fall below a minimum level (e.g., a level wherein the HD cameras cannot capture a clear image and/or video). The ID lights may be LED IR bulbs or any other suitable IR bulbs. An ambient light sensor 111 is integrated into each cluster of IR lights to detect the ambient lighting conditions within the location, viewing area, or room that the controller 100 is located. The IR lights 109 and light sensor 111 may be built-in components of HD cameras 104A, 104B, or they may be separate components wired into the camera system. Additionally, the HD cameras may be provided with IR filters (not illustrated) which automatically extend across the lenses of the HD cameras when the ambient light sensors 111 detect that ambient lighting conditions have fallen below a minimum level. The infrared filters are used to pass infrared light and block visible and ultraviolet light when the IR lights are activated to prevent unnatural-looking videos and/or still images. A suitable commercially available HD camera for use in the controller device of the present invention is the 2.0 megapixel USB camera manufactured by ELP Surveillance System—Model No. ELP-USBFHD01M-IR.

Figure 14:
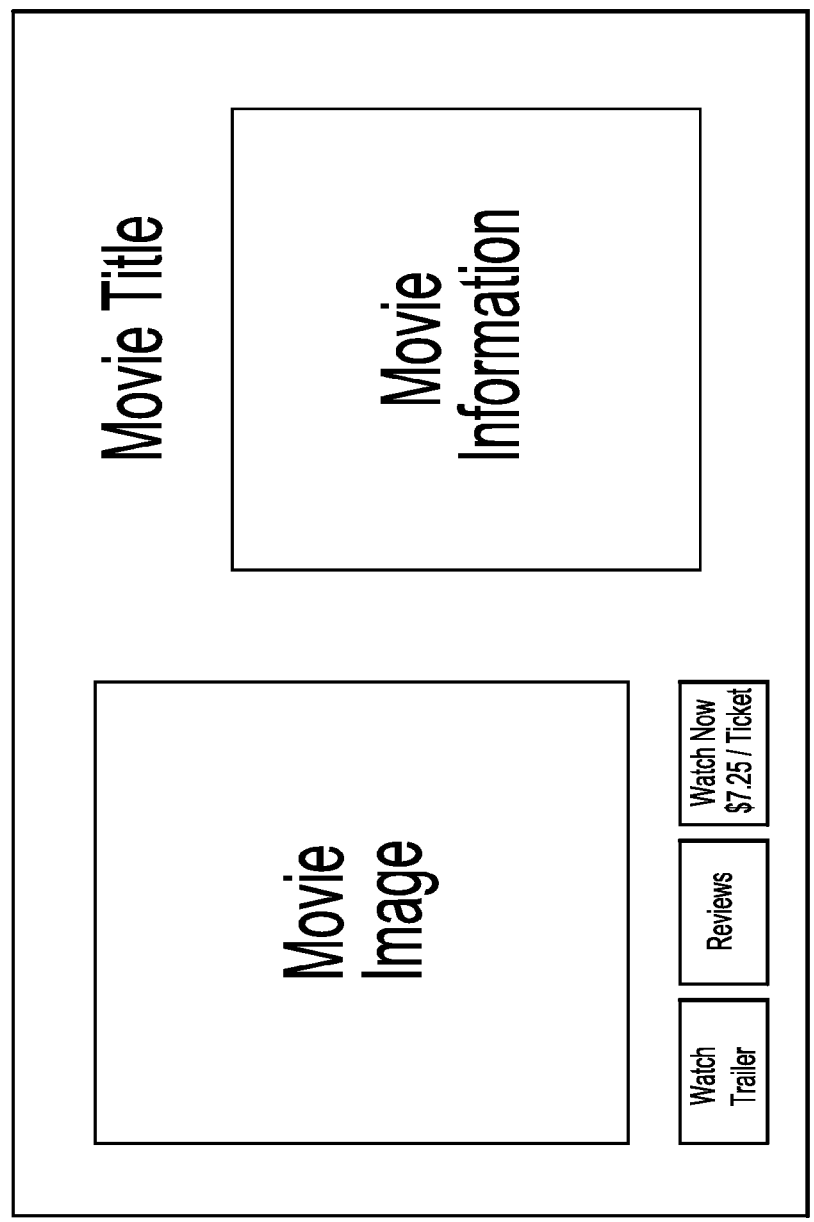
FIG. 14 diagrammatically depicts a screen shot of a display unit illustrating ticket price per person information generated by the present invention.

The HD cameras 104A, 104B use facial recognition software to detect the number of persons of an audience 500 (FIG. 14). However, facial recognition technology has its flaws and, at times, may detect large portraits and/or statues with a face. Thus, the use of facial recognition technology alone to detect the number of persons of an audience may be somewhat unreliable. Therefore, in one embodiment of the present invention, the controller 100 additionally uses the thermal camera 105 to detect a body heat pattern of human skeletal figures. The body heat pattern ensures that the detected skeletal object is generating heat unlike a statue or portrait. In other words, the body heat pattern of a detected skeletal object provides "proof of life" of the detected face. A suitable commercially available thermal camera for use in the controller device of the present invention is the Lepton Longwave Infrared (LWIR) Camera Module manufactured by FUR® Systems.

Additionally, the use of two HD cameras 104A, 104B for stereoscopic vision (or stereoscopic imaging defining a system field of view) not only captures clear video and/or still images of the location, viewing area, or room in which the display unit displaying the streaming content is located, it further detects the distance of people from the controller 100. Detection of this distance, combined with the size of a recognized face, is used for determining whether a person of an audience 500 is an infant/toddler/child, as opposed to an adult. This differentiation may be important since access to multimedia content may have lower fees and/or may be restricted for children audience members in comparison to higher fees and larger selections of content for adult audience members.

While the use of HD cameras and thermal cameras are mentioned as being suitable cameras to detect the number of audience members in a location, viewing area, or room, any other suitable camera may be used, either individually or together, to capture video and/or still images for the purpose of detecting audience members. For example, a RGB camera may be used to obtain very accurate color images of the location, viewing area, or room the controller 100 is located. Similarly, a 3D camera or other depth sensing camera configured to capture video and/or still images with depth information including a depth image that may include depth values via any suitable technique including, for example, time-of-flight, structured light, stereo image, or the like, may be used. Moreover, depending upon design criteria, more or less than two HD cameras or other suitable cameras, may be used to capture video and/or still images of the location, viewing area, or room. For mobile applications (e.g., smartphone and/or tablet), a different controller is used, i.e., a controller specially designed for the mobile consumer. Specifically, the mobile controller is a smartphone or table attachment which uses a built in thermal camera together with the internal camera of the smartphone/tablet to detect the audience.

Figure 11:
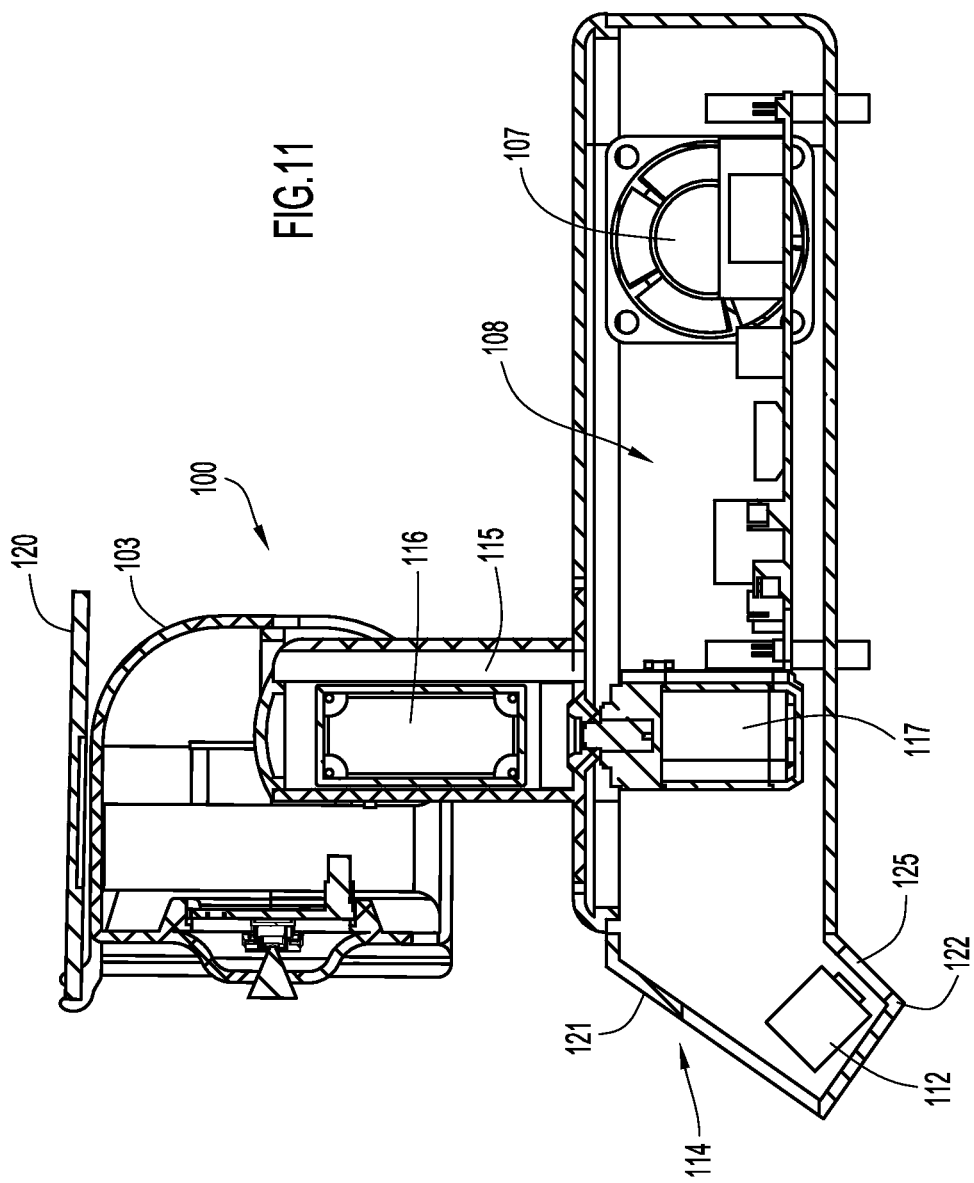
FIG. 11 is a cross-section view of the controller of FIG. 1 showing the reverse camera, the reverse camera aperture, the servo motors, the microphone, and the electronic control components.

With reference to FIG. 11, the controller 100 is further provided with a reverse camera 112 oriented to look back and down at the screen of the display unit 200. Specifically, the base 101 of the controller includes a front extension 114 which extends forwardly and downwardly at an angle from the base. The front extension has a top wall 121, a bottom wall 122, and side walls 123 defining an interior space. At least the bottom wall 122 extends downwardly at an angle of approximately 45° from a lower wall surface 115 of the base. The downwardly extending bottom wall 122 includes an aperture 125 extending therethrough (see FIGS. 3, 5, 7, and 11). The reverse camera 112, as shown in FIG. 11, is housed within front extension 114 of the base and is configured to look directly back at the screen of display unit 200, via aperture 125, to capture images and/or video from the screen of the display unit. Moreover, the reverse camera 112 is further configured to capture a watermarked code inserted in a portion of the content being streamed by system server 300. For example, the watermarked code may be inserted in a small portion of content which is captured by the reverse camera, as shown by the arrow in FIG. 9. The capture of a watermarked code by the reverse camera provides a measure of security to confirm that the controller 100 is in the same room as the display unit 200 and, in addition, that the controller is mounted correctly to the display unit. Any generic, commercially available HD mini pin-hole USB camera may be suitable for use as a reverse camera in the controller device of the present invention. Watermarking techniques are well known in the art, examples being found in U.S. Pat. No. 5,809,139, U.S. Pat. No. 5,915,027, U.S. Pat. No. 6,809,792, and U.S. Pat. No. 7,779,271; the disclosures in these patents documents are incorporated herein by reference in their entireties.

The watermarked code is embedded in the content pixels of the streaming content by the system server 300. The controller 100 analyses the content pixels (video or image) to capture the watermarked code. The watermarked code may be a company logo, such as XCINEX™, or any other suitable word, logo, image, number, or combination thereof. The controller 100 utilizes the captured watermark to confirm that it is in the same room, viewing area, or location as the display unit 200 which streamed video is being displayed. The use of watermarking technology makes it possible to ensure that the controller 100 is in the same room, viewing area, or location as the display unit 200 which the streamed content is being displayed. The controller 100 utilizes a processor (e.g., a microprocessor or microcontroller) including a memory (e.g., read only memory (ROM), random access memory (RAM), magnetic disk storage media device, optical storage media devices, flash memory devices, electrical, optical, or other physical/tangible (non-transitory) memory storage devices) to analyze and store the watermark captured by the reverse camera 112. In one embodiment, the controller 100 may utilize an authentication program (i.e. software) with a signal printing program (i.e., software) to analyze the images and/or video of the display unit 200 to detect the watermarked code.

Additionally, a server-side watermarking system may be installed onto the system server 300 to digitally insert a watermark incorporating the username and IP address of the subscriber or end user into the streamed content displayed on the display unit 200. This digital watermark is invisible to the human eye. The HD cameras 104A, 104B, while capturing approximately 150° to 360° images or video of the location, viewing area, or room, additionally capture a screen shot of the display unit 200. From the screen shot, the controller 100 extracts the username and IP address of the user from the content. This alternative watermarking system not only provides further assurance that the controller is always in the same room as the display unit 200 to which content is being streamed to/from the system server 300 but, more importantly, it provides identifying information which may be traced back to a user in the event content is illegally copied or stolen. This identifying information not only serves to identify the user who pirated the streamed content, it serves to deter others from recording, copying, and sharing streamed content without authorization. Furthermore, using a strategic key, such as IP address and Username, to detect people that manage to bypass the other deterrents incorporated into the system and pirate a movie, provides authorities with a useful tool to apprehend the person who stole the movie if the stolen movie is ever shared online.

The controller 100 further utilizes an audio logger system as a secondary line of security to confirm that the controller is always in the same room as the display unit 200 which content is being streamed to/from the system server 300. Specifically, within the first few seconds of the controller 100 initiating an audience scan, the controller downloads the exact section of audio from the content being streamed from the system server 300. For TV applications, the microphone 107 of the controller is used to capture the audio from the speakers of the TV (display unit 200) to which content is being streamed to/from the system server 300. Thereafter, the controller matches the captured audio file with the sound emitted from the speakers of the TV, which content is being streamed to/from the system server 300, with the audio file the controller 100 downloaded. When the two files match, this provides further confirmation that the controller 100 is in the same room as the TV (display unit) which content is being streamed to/from the system server 300. In one embodiment of the present invention, the controller 100 may utilize a watermark system with an audio logger system to analyze and compare an audio file captured by the microphone with the sound file of the content at the same time interval. If the sound captured by the microphone at a certain time interval of the content matches the audio file data of the content for the exact same time interval, then the controller 100 may assure itself that it is in the same location, viewing area, or room as the display unit 200 which streamed content is being displayed.

In one embodiment, the system of the present invention permits the controller 100 to detect any external recording devices which may be present in the location, viewing area, or room during content streaming. Specifically, during its detection cycle to determine the number of audience members 500, the controller 100 emits IR light in a specific distinct pattern. While the controller is emitting this distinct pattern of light, the HD cameras 104A, 104B are taking video and/or multiples images of the location, viewing area, or room. If there is an external camera pointed at the display unit 200, the IR light will reflect from the external camera's lens causing sparkles of light to be present in the captured images or video. The controller analyzes the images or video to detect the IR light reflections. If one or more reflections are detected, the controller 100 confirms that a recording device, e.g., a camera, is pointed at the display unit. The system determines whether the reflections (sparkles) captured in the video or images are from a camera lens or from someone's eyeglasses. If it is confirmed that the reflections are from a camera lens, the content being streamed to the display unit 200 is paused and a message is promptly displayed on the screen of the display unit informing the user of the detected external recording device (i.e., camera). The streaming content remains indefinitely paused until the user removes or changes the direction of the external recording device (i.e., camera) that has been pointed at the display unit.

In another embodiment, the controller 100 utilizes the same technology used for detecting a camera pointed at the display unit 200 to further detect whether a mirror or glass cover has been positioned in front of the camera module 103. This is an important feature of the present invention because HD cameras cannot see through mirrors and thermal cameras cannot see through mirrors or glass. Thus, the placement of mirrors and glass in front of the camera module would result in HD cameras 104A, 104B and thermal camera 105 not being able to properly detect the number of members of the audience 500. Similarly, the HD cameras would not be able to detect external cameras in the location, viewing area, or room. Therefore, controller 100 is configured to detect itself in a mirror, as well as to detect a glass cover positioned in front of the camera module. Specifically, the IR light sources 109 emit IR light in a specific distinct pattern as the HD cameras are taking images of the location, viewing area, or room. The specific distinct pattern of IR light may be the same pattern used to detect an external camera in the viewing area or a different pattern altogether. The images taken by the HD cameras are analyzed by software to detect if a mirror has been placed in front of the camera module 103, or if a glass cover is being used to tamper with the human body heat detection process discussed above. If the controller 100 detects either type of tampering mechanism, the controller immediately pauses content being streamed to the display unit 200 and sends a prompt message to the user regarding the detection of a tampering mechanism.

In one embodiment, the improved system and apparatus for providing consumers the opportunity to watch first-run multimedia content or a-la-carte premium TV programming in the comfort of their own homes or at a location with a display unit (e.g., Smart TV) and high speed internet connection, utilizes a pay-per-play-per person-per-unit of time scheme. For instance, once the system software is downloaded to a display unit (e.g., Smart TV) and a user chooses content to watch, the user is directed by the controller 100 to a payment page where a message advises the user of the cost per-hour-per-person for the selected content, for example, $0.35 per-hour for each person of the audience. Thus, if only two people watch the selected content, the total cost would be $0.70 per-hour. To implement the pay-per-play-per person-per-unit of time scheme of the present invention, the controller 100 includes a timer apparatus for measuring the time during which a pay-per-view program is being received. The timer apparatus is incorporated into the payment system disclosed in my U.S. Pat. No. 8,893,163, the disclosure of which is incorporated herein by reference it its entirety. The timer apparatus may be similar to the timer apparatus disclosed in U.S. Pat. No. 4,759,060 to Hayashi et al., the disclosure in which is also incorporated herein by reference in its entirety.

The controller 100 has an onboard computer system to run software for communication and connection to the internet. The components of the onboard computer system are incorporated onto a motherboard housed within the base 101 of the controller. A suitable commercially available motherboard for use in the controller of the present invention is a Cubieboard—Model Cubietboard A7 Cubietruck. In addition, the computer system has an operating system, such Java, C, C++, Android, or any other suitable operating system; single or multiple processors; memory to store executable commands and data; a global positioning system (GPS) to check its location; tilt sensors to ensure the user cannot tamper with the controller, such as moving or tilting the controller; and proximity sensors to check the distance the controller is from objects, such as walls, tables, sofas, enclosures and tampering devices. In one embodiment, the controller has a built-in image processing engine which includes a processing unit comprising one or more processors to enable the controller to internally process and analyze images, and a memory unit configured to store various still images or video files internally within the controller.

In one embodiment of the invention, the controller 100 contains an audience detection engine which uses a vast data library of skeletal still images and video/algorithms, all stored in an image processing engine memory unit, to compare with the video or still images of the location, viewing area, or room captured by the video and/or still capturing system. The audience detection engine compares the X, Y coordinates of persons of an audience detected in the captured images by the video or still image capturing system. For example, the X, Y coordinates of detected faces on the still images or video captured by the HD cameras 104A, 104B, with or without the IR filter, is analyzed and compared to the X, Y coordinates of skeletal body heat patterns detected using the thermal camera 105 by the audience detection engine.

In one embodiment, the controller 100 contains a pattern recognition engine which uses a vast data library of objective still images and video/algorithms, such as tables, chairs, baby carriages, sofas, couches, plants, and pets, all stored on the image processing engine memory unit, to analyze the video or still images of the location, viewing area, or room where the display unit 200 is located that were captured by the video and/or still image capturing system.

In another embodiment, the controller 100 has wireless connection capabilities utilizing a plurality of configured systems, for example, wireless internet capability using Wi-Fi, built-in Bluetooth or similar short-range radio technology capability to connect to the display unit to obtain user network access information from platform communication software installed on the operating system of the display unit, GMS with SIM card capability to secure its own secure internet connection to communicate with server and storage platforms, and any other suitable wireless connection capability useable either individually or in combination. In addition, one embodiment of the present invention uses a LAN wire connection to access the internet, which is more suitable for users without wireless internet access. All system communications are done with encrypted data transfer.

The controller 100 may include a plurality of transmitters, receivers, and sensors to detect movement, location, vibrations, IR signals, etc. In one embodiment, the controller has an IR transmitter and receiver to transmit and receive IR signals for communication or any other suitable purpose. In another embodiment, the controller 100 has an accelerometer to detect movement and any other suitable action, and a magnetometer to detect and measure a magnetic field, as well as its strength and direction. The magnetometer's measurements are used by the controller to detect other electronic devices in the same location as the controller, such as external cameras. In a further embodiment, the controller has a microphone to capture audio signals/data from the same location, viewing area, or room that the controller is located.

In one embodiment, the controller 100 connects to a secure server and storage platform. Specifically, the controller may utilize cloud servers, such as cloud servers by Amazon® and Microsoft®, as well other private cloud servers, to connect to the secure server and storage platform. The server and storage platform may be secured utilizing 256 bit encryption standards, e.g., SSL Certificate data files that digitally bind a cryptographic key to an organization's details. When installed on a web server, it activates the padlock and the https protocol (over port 443) and allows secure connections from a web server to a browser. In addition, the server and storage platform may undergo continuous penetration stress tests, e.g., a "pentest," to evaluate computer and network security by stimulating an attack on a computer system or network from external and internal threats in order to ensure the security and integrity of the server and storage platform. All data being streamed from the server and storage platform to the platform communication software installed on the operating system of the display unit is monitored. For example, if content 2 gigabytes in size is being streamed, but the controller is detecting larger sizes of data being transferred, such as 3 gigabytes, this will immediately create a red flag in the system which will allow technicians to explore where the extra 1 gigabyte of data is being transferred. All communication (i.e., data sent and received) between the server and storage platform, the controller, and the software platform is encrypted using, e.g., the 256 bit encryption.

In one embodiment, the server and storage platform has a "control panel" (called a "Serve and Control Panel") to provide technicians remote access to the server and storage platform for service and troubleshooting purposes. There may also be a "control panel" (called "Content Provider Interface") for content providers which will allow them access to analytics and demographics data about their uploaded content.

In another embodiment, the server and storage platform utilizes a server-side watermarking system to eliminate the possibility of a user recording, copying, and sharing the content without authorization. When content is being streamed to the display unit which the software platform is installed, the side-serve watermarking system digitally watermarks the username and IP address of the user into the streamed content as discussed above. As mentioned previously, the digital watermark is invisible to the human eye, but if a user decides to copy the content with an external camera and share it without authorization, the user can be detected by extracting the digital watermark from the system.

To use the thermal camera 105 to detect the number of persons in an audience, the following steps are performed. First, capture a 150°-360° video and/or still images of the location, viewing area, or room. Next, extract digital data from the image and isolate objects in the image. Thereafter, find the edge of the objects utilizing white hot and black cold parameters (e.g., in the manner disclosed in U.S. Pat. No. 7,027,621) and calculate the X, Y coordinates of the white body heat pattern. Then, find and analyze human head/body data using statistical tests, and 2D and 3D human head/body position data in the video and/or images. Finally, eliminate duplicate positions and obtain the number of human audience members in the video and/or image.

To use the HD cameras 104A, 104B with IR light sources 109 (but without the IR filters) to detect the number of human persons in an audience, the following steps are performed. First, capture a 150°-360° video and/or images of the location, viewing area, or room. Utilizing face detection, skin color and posture recognition software, detect people in the video and/or images. Then, calculate the X, Y coordinates of the detected faces in the video and/or images. Next, utilize stereo vision to calculate the distance (Z coordinates) of faces detected from the controller (data is critical to exclude infants). Thereafter, compare the X, Y coordinates of the detected faces over 5 years of age with the thermal camera images to ensure that the detected faces are releasing body heat. After comparing, eliminate false faces like portraits, statues, and infants, obtain the final number of human audience members in the location, viewing area, or room, and send only the number of persons in the audience to the server 300. Next, the server compares the final number with the number of tickets purchased and continues to stream content only if the number of audience members is equal to or less than the number of tickets purchased.

To use the reverse camera 112 to detect whether or not the controller is in the same location, viewing area, or room as the display unit, the following steps are performed. First, the server 300 sends a signal to the controller 100 and the reverse camera 112 is activated and captures a still image or video of the content being streamed to the display unit 200. Next, the captured image or video is analyzed and the watermarked code is extracted. Thereafter, the controller 100 confirms whether it is in the same room as the display unit to which content is being streamed and, if so, sends the server an OK signal. Upon receiving the OK signal, the server 300 continues to stream the content. However, if the server 300 did not receive the OK signal, the content stream is paused and the system assists the user rectify the problem.

Figure 15:
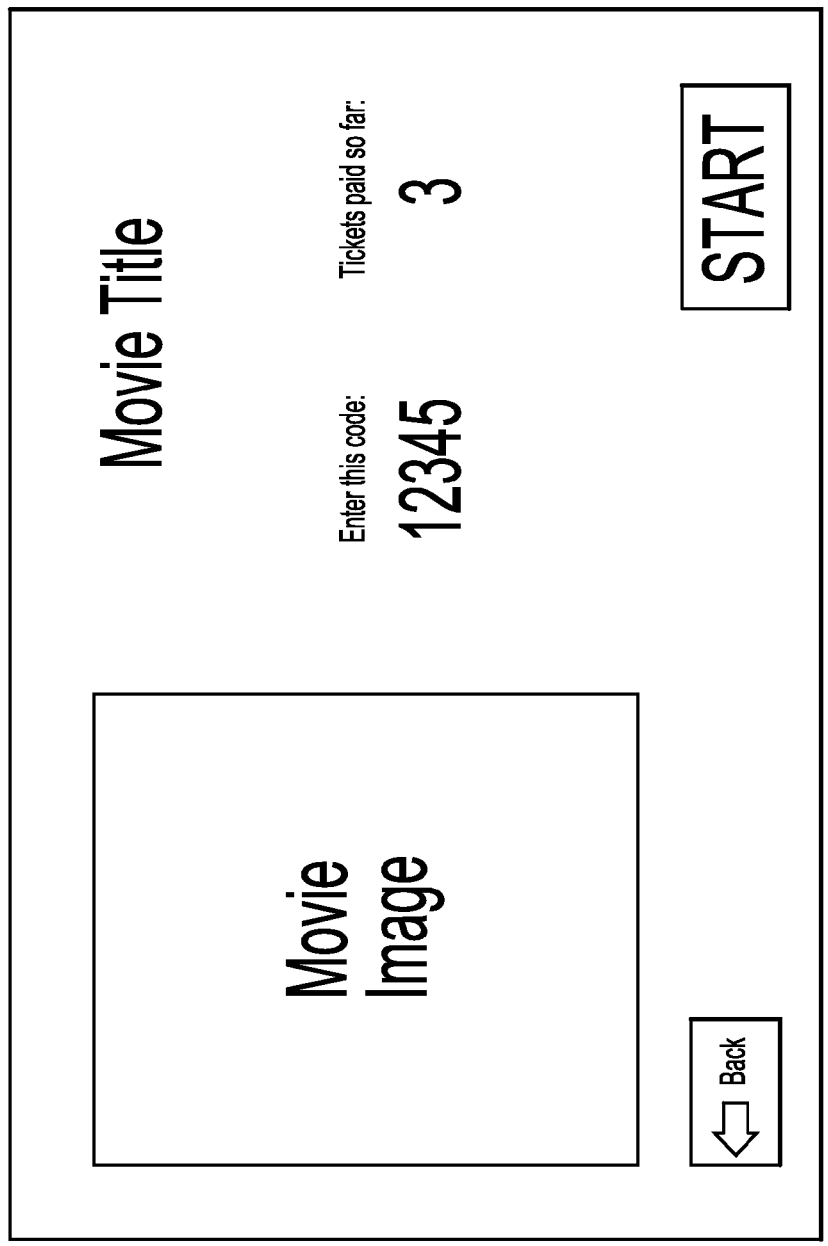
FIG. 15 diagrammatically depicts a screen shot of a display unit illustrating authorization ticket code and number of tickets purchased information generated by the present invention.

An example of the flow process for watching first-run movies at home will now be described in detail. A user/member/subscriber purchases the controller 100, downloads/installs the proprietary software program, and powers up the controller. The controller automatically creates its own hot spot. Thereafter, the user accesses the hot spot by using a computer or processor (e.g., laptop or desktop computer, tablet or smartphone) to select the Wi-Fi option and launch the browser. Once the browser is launched, the controller internet configuration page is displayed which includes setup steps for connecting the controller to Wi-Fi. When a Wi-Fi connection is established, the controller's software program is launched and installed on the display unit. Next, a username and password is created and all registration requirements completed. Thereafter, the user is directed to a main menu which contains content to be selected. From the main menu, the user may choose to exit out of the main menu, watch free movie trailers, browse more movie content, or select movie content to watch now. If a user selects to watch movie content now, the controller 100 is activated, the user is directed to a payment page where an appropriate number of tickets are purchased and paid for via an e-commerce transaction, such as electronic transfer or credit card entry. For example, the payment page may display ticket price per person information, as shown by the screen shot in FIG. 14, as well as number of tickets purchased information, as shown by the screen shot in FIG. 15. When payment is received, whether or not payment is adequate for the number of persons viewing the movie, content begins to stream to the display unit 200.

Figure 16:
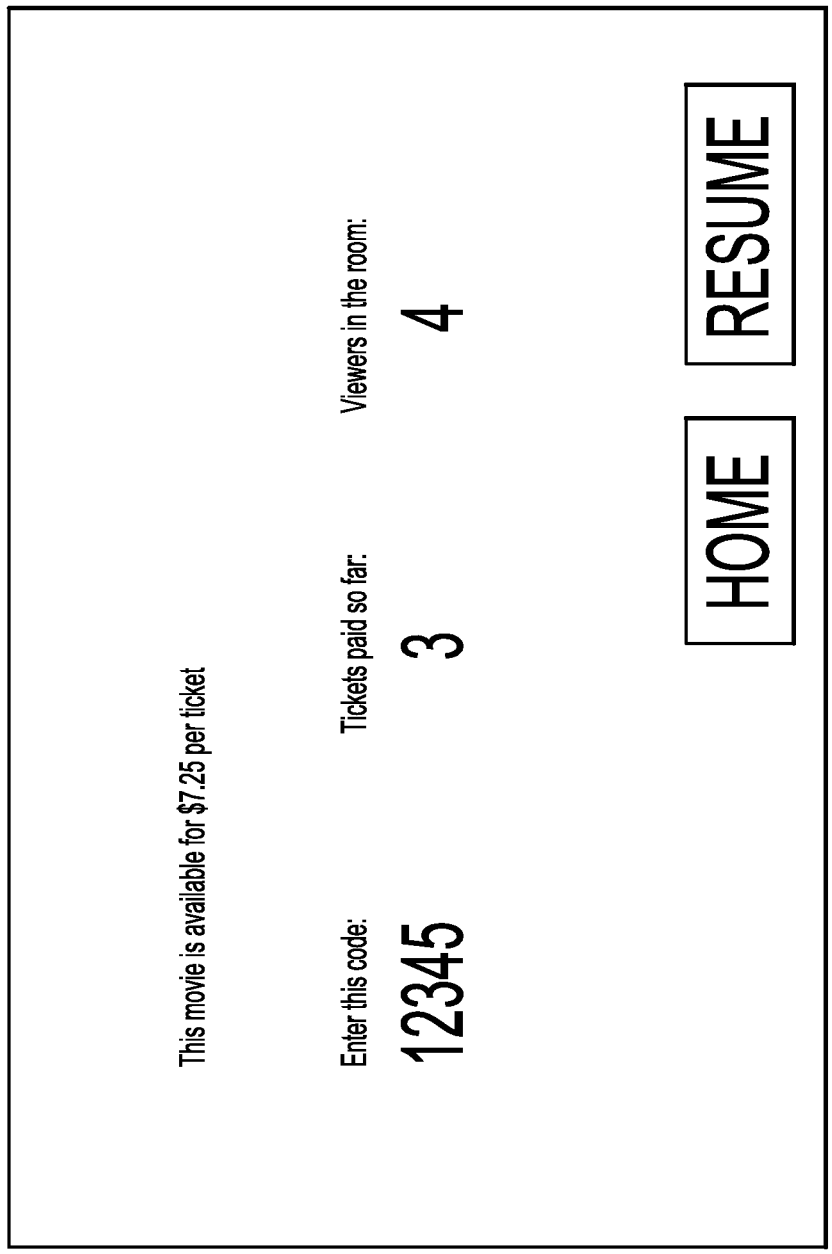
FIG. 16 diagrammatically depicts a screen shot of a display unit illustrating authorization ticket code, numbers of tickets purchased, and number of viewers presently in the viewing area information generated by the present invention.

Once content starts to stream, the controller 100 is activated to capture video/image content from the display unit for analysis and begin multiple scans to detect the number of audience members viewing the content. The captured video/image content is analyzed for a watermark code in the pixel data to confirm that the controller is in the same viewing area or room as the display unit to which content is being streamed. Upon competing analysis of the scan, the controller sends to the server 300 the number of people detected in the viewing area or room and completely deletes the captured data for security purposes. The server compares the number of tickets purchased with the number of persons detected in the audience to determine if the proper payment has been made for all detected audience members. In this regard, the number of persons detected must be equal to or less than the number of tickets purchased for viewing of the streamed content. If more people are detected in the room than tickets purchased, the streaming content is paused or stopped until more tickets are purchased. However, the controller waits in a standby mode for at least one scan cycle before pausing/stopping the streaming content in the event someone briefly entered the room for a purpose other than watching the movie. If upon a second or subsequent scan (which may take place, for example, anywhere from two to fifteen minutes later) an extra audience member is still detected, the controller pauses/stops the streaming content, and switches to an additional payment mode where options are displayed on the screen of the display unit 200 to advise the user as to what must be done to resume watching the content. For example, one option could be to purchase extra tickets for the additional audience member, as shown by the screen shot in FIG. 16, while a second option could be to ask the additional audience member to leave the room. Alternatively, another option could be to save the content to an account set up by the user for viewing at a later desired time. However, to resume viewing at a later time the number of audience members must be equal to or less than number of tickets previously purchased and the content must still be available for streaming to the display unit.

If a user decides to purchase an extra ticket for the additional audience member, the user may purchase the extra ticket by using the display unit remote control or a remote application for a smartphone or tablet. Once the purchase is completed, content delivery is resumed without any interruption. It should be appreciated, however, that the display unit remote control, as well as the remote applications for smartphones or tablets, may be used to control all other interactive functions performed by the user. In addition, if a user of the system likes the content or soundtrack of the movie being viewed, the user may purchase the entire movie or just the soundtrack of the movie for digital download to the system's media library during initial content download. Typically, the soundtrack of a movie is available for immediate digital download, while the video content of the movie is usually not available for digital download until the movie is released to the general public. Nonetheless, it should be further appreciated that all digital content, whether video or audio, is delivered to a user via encrypted download. The user can access soundtracks from the media library using any device from any location, however, all devices must have the system software downloaded and installed to operate the media library.

A user/member may create a child account under his/her own account. Under the user/member profile, a user chooses the create child account option and creates a specific password for the child, e.g., the child's name or a random sequence of letters and/or numbers. In addition, the member may choose which content to block according to content ratings and sets a ticket quota for the child account. The child may log into the system using the main member's username and his/her child account password. The child may browse content which the user/member has deemed appropriate and watch selected content by purchasing as many tickets as the pre-established ticket quota permits.

Alternatively, the improved system, method and apparatus of the present invention allows a user/member to choose to watch a first-run movie or premium TV programming in an à la-carte manner utilizing a pay-per-play-per-person-per-unit of time scheme. For example, consumers currently must purchase a bundled package of channels from internet providers, such as Verizon® or Comcast®. The bundled package is expensive and usually comes with many more channels than a typical viewer may watch. However, with the system/apparatus of the present invention, once the proprietary system software is downloaded to a display unit (e.g., Smart TV), the user chooses "TV" from a menu and selects a channel to watch from a displayed TV guide. A message prompts the user that the cost of the selected channel is, for example, $0.35 per-hour and per-hour-per-person. Thus, if two people watch the selected channel, the total cost would be $0.70 per-hour. Therefore, the system/apparatus of the present invention allows consumers the option to choose their entertainment programming in an a la-carte manner. There is no monthly TV bundle package purchase and consumers only pay for the channels they watch. Moreover, consumers would not be required to pay for content when the TV is off and not being watched, e.g., hours at work and days away on a trip, as well as during commercial breaks when purchased TV content is not being watched. Furthermore, the content providers would have the ability to set the prices charged per-hour-per-person-per-unit of time which would generate more revenue for the content providers.

Again, the purpose of the system, method and apparatus of the present invention is to provide consumers the opportunity to watch first-run motion pictures available only at cinemas or theaters, live concerts and sporting events, musicals, operas, Broadway shows, comedy shows, and seminars in the comfort of their own homes, at any location with a display device and high-speed internet connection, or on-the-go with a mobile device, such as a smartphone or a tablet, while providing additional safeguards, such as enhanced authentication and verification schemes, to preclude first-run content from being shared or recorded without authorization. The first-run content may be viewed by a user of the system on a pay-per-view-per-person-per-unit of time basis. The enhanced authentication and verification schemes include schemes to ensure that content is delivered to the appropriate number of viewers and a user provides adequate payment for the proper number of viewers; to confirm that a controller is in the same room as the display unit (e.g., Smart TV) to which the content is being streamed; to detect if any external recording devices are in the location, viewing area, or room, such as a camera pointed at the display unit, which would suggest an attempt is being made to steal content without authorization; and to provide personal identifying information which can traced back to a user who pirated streaming content.

Having described preferred embodiments of a new and improved system and apparatus to provide consumers the opportunity to watch first-run motion pictures and other first-run content while providing enhanced authentication and verification safeguards, it is believed that other modifications, variations, and changes will be suggested to those skilled in the art in view of the teachings set forth herein. It is therefore to be understood that all such variations, modifications, and changes are believed to fall within the scope of the invention as defined by the appended claims. Although specific terms are employed herein, they are used in a generic and descriptive sense only and not for purposes of limitation.

What is claimed is:

1. A controller for controlling pay-per-view streaming of digital audio and video content to a content display unit having a video display screen and audio speakers and being watched and/or listened to by an audience in a viewing area, the controller comprising:
   a housing configured to be disposed proximate the display unit, said housing including a base and a camera module mounted on the base;
   a processor and memory located within the base; and
   a plurality of cameras housed within the module and having a system field of view including the viewing area and operatively connected to the processor to detect a presence of one or more members of the audience in the viewing area;
   wherein said housing is configured to be attachable to an upper edge of said display unit,
   wherein said base comprises a front portion extending forwardly and downwardly from said upper edge portion, the front portion includes a wall with an aperture extending therethough that faces the screen of the display unit, and wherein a reverse camera is housed within the front portion and oriented therein to view directly back through the aperture at the screen to capture a digital watermark inserted in the streamed digital video content on the screen to confirm that the controller is within the viewing area.

2. The controller of claim 1, wherein the reverse camera is oriented to view the screen of the display unit to capture at least a portion of a screen shot of the display unit.

3. The controller of claim 1, wherein the plurality of cameras includes two HD cameras spaced apart to provide stereoscopic imaging defining said system field of view, and a thermal camera mounted between the two HD cameras.

4. The controller of claim 3, wherein each HD camera includes IR light sources to illuminate the viewing area when ambient lighting conditions fall below a minimum level, and an ambient light sensor to detect the ambient lighting conditions within the viewing area.

5. The controller of claim 4, wherein the IR light sources and the ambient light sensor are built-in components of the HD cameras.

6. The controller of claim 3, wherein the HD cameras include facial recognition software to detect the presence of one or more members of the audience in the viewing area.

7. The controller of claim 6,
   wherein the stereoscopic imaging of the HD cameras detects the distance the one or more members of the audience are from the controller, and
   wherein detection of the distance in combination with detection of recognized faces determines whether one or more of the members of the audience are infants/toddlers/children.

8. The controller of claim 3, wherein the thermal camera detects a body heat pattern of persons in the audience to differentiate humans from statues or portraits in the viewing area.

9. The controller of claim 3, wherein the HD cameras include IR light sources which, during a detection cycle of the HD cameras to detect the presence of one or more members of the audience in the viewing area, emit IR light in a distinct pattern to detect any external cameras in the viewing area.

10. The controller of claim 9,
    wherein the emitted IR light reflected from lenses of detected external cameras is in the system field of view and present in captured images or video taken by the HD cameras during the detection cycle, and
    wherein the processor is configured to analyze the captured images or video to detect the IR light reflections.

11. The controller of claim 9,
    wherein the IR light sources during the detection cycle emit IR light in a distinct pattern to detect mirrors or transparent covers positioned in the system field of view, and
    wherein the processor is configured to analyze captured images or video taken by the HD cameras during the detection cycle to determine whether mirrors or transparent covers are positioned in the system field of view.

12. The controller of claim 1,
    wherein the housing further includes a vertically extending hollow post having one end secured to an upper wall surface of the base and another end secured to the module to pivotally support the module above the upper wall surface,
    wherein a first servo motor is mounted within the base to automatically rotate the module left and right about a vertical axis, and a second servo motor is mounted within the hollow post to automatically rotate the module up and down about a horizontal axis, and
    wherein rotation of the module about the vertical and horizontal axes enables the plurality of cameras housed within the module to capture video and/or still images of the viewing area from wall to wall and ceiling to floor to detect the presence of one or more members of the audience in the viewing area.

13. The controller of claim 1,
    wherein the module includes a front cover flap pivotally mounted on a forward edge of the module for rotation between an open position and a closed position, and
    wherein the flap, when in its closed position, covers the plurality of cameras housed within the module to secure the privacy of the viewing audience.

14. The controller of claim 1, further comprising a microphone mounted within the base, the microphone being configured to capture the audio from the speakers of the display unit for matching with a captured audio file previously downloaded by the controller from the digital content being streamed from a system server to confirm that the controller is in the viewing area.

15. The controller of claim 1,
wherein a server-side watermarking system digitally inserts a watermark incorporating a username and IP address of an end user into the streamed digital video content, and
wherein the processor is configured to extract the username and IP address of the user from the video content to provide identifying information which is traceable back to the user in the event content is illegally copied or stolen.

16. A system for controlling pay-per-view streaming of digital audio and video content being watched and/or listened to by an audience in a viewing area, the system comprising;
a content display unit having a video display screen and audio speakers;
a controller having a housing configured to be positionable proximate the display unit, said housing including a base and a camera module mounted on the base;
a processor and memory located within the base; and
a plurality of cameras housed within the module and having a system field of view including the viewing area and operatively connected to the processor to detect a presence of one or more members of the audience in the viewing area,
wherein the cameras are configured to scan the viewing area during streaming of the content to capture video and/or still images of the viewing audience in the system field of view,
wherein the processor is configured to analyze the captured video and/or still images to determine whether more audience members are present in the viewing area during streaming of the content than tickets purchased to view the pay-per-view digital content, and
further comprising a reverse camera housed within the base at an orientation to view the screen of the display unit to capture at least a portion of a screen shot of the display unit;
wherein said housing is attached to an upper edge of said display unit,
wherein the base has a forwardly and downwardly extending front section which includes a reverse camera aperture extending through a wall of the front section and facing the screen of the display unit, and
wherein the reverse camera is housed within the front section and oriented therein to view directly back through the reverse camera aperture at the screen to capture a digital watermark inserted in the streamed digital video content on the screen to confirm that the controller is within the system field of view.

17. The system of claim 16, wherein the plurality of cameras includes at least one HD camera to capture images of the audience members in the system field of view during streaming of the content, and a thermal camera to capture images of body heat patterns of humans present in the system field of view during streaming of the content to distinguish human audience members detected by the at least one HD camera from portraits and/or statues with faces.

18. A method for controlling pay-per-view streaming of digital audio and visual content being watched and/or listened to by an audience in a viewing area, the method comprising;
displaying the streaming digital video content on a display unit having a screen;
delivering sound representing the streaming audio to the viewing area from speakers in said display unit,
with a control module having HD camera units, a thermal camera, a processor and a memory, the control module having a housing configured to be positionable proximate the display unit, said housing including a base and a camera module mounted on the base; a processor and memory located within the base and the HD camera units and the thermal camera are housed within the camera module;
wherein said housing is attached to an upper edge of said display unit, wherein the base has a forwardly and downwardly extending front section which includes a reverse camera aperture extending through a wall of the front section and facing the screen of the display unit, and
scanning the viewing area with the HD camera units and thermal camera during streaming of the content to capture video and/or still images of the viewing audience,
analyzing the captured video and/or still images with the processor to determine whether more audience members are present in the viewing area during streaming of the content than tickets purchased to view the pay-per-view digital content,
capturing a digital watermark inserted in the streamed digital content on the screen with a reverse camera housed within the front section and oriented therein to view directly back through the reverse camera aperture at the screen to confirm that the control module is within the viewing area, and pausing the streaming content when more audience members are detected than tickets purchased.

19. The method of claim 18, wherein said HD camera units include a visible light camera and an IR camera, the method further comprising scanning the viewing area with the visible light camera when the ambient light in the viewing area is above a predetermined light level, and scanning the viewing area with the IR camera when the ambient light level in the viewing are is below said predetermined light level.

20. The method of claim 18, further comprising enabling audience members to pay for the streamed content in units of time.

* * * * *